US012644956B2

(12) United States Patent
Dhekne et al.

(10) Patent No.: US 12,644,956 B2
(45) Date of Patent: Jun. 2, 2026

(54) ON-BODY SENSOR SYSTEM AND METHOD FOR AUTOMATIC INTERPRETATION OF VISUAL BODY SIGNALS

(71) Applicant: Georgia Tech Research Corporation, Atlanta, GA (US)

(72) Inventors: Ashutosh Dhekne, Atlanta, GA (US); Mostafa H. Ammar, Atlanta, GA (US); Yifeng Cao, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 446 days.

(21) Appl. No.: 18/312,270

(22) Filed: May 4, 2023

(65) Prior Publication Data

US 2023/0358848 A1    Nov. 9, 2023

Related U.S. Application Data

(60) Provisional application No. 63/338,195, filed on May 4, 2022.

(51) Int. Cl.
G01S 5/02 (2010.01)

(52) U.S. Cl.
CPC .......... G01S 5/0284 (2013.01); G01S 5/0264 (2020.05); *G01S 2205/08* (2020.05); *G01S 2205/09* (2020.05)

(58) Field of Classification Search
CPC .. G01S 5/0284; G01S 5/0264; G01S 5/02585; G01S 5/0278; G01S 2205/01; G01S 2205/08; G01S 2205/09
USPC ................................ 342/350, 351
See application file for complete search history.

(56) References Cited

U.S. PATENT DOCUMENTS

| | | | | |
|---|---|---|---|---|
| 9,939,910 B2 * | 4/2018 | Shah | | G10H 1/0008 |
| 10,234,956 B2 * | 3/2019 | Shah | | G10H 1/348 |
| 12,069,437 B2 * | 8/2024 | Stapf | | A61B 5/741 |
| 12,204,805 B2 * | 1/2025 | Anderson | | G06F 3/14 |
| 2018/0070875 A1 * | 3/2018 | Kshetrapal | | A61B 5/388 |
| 2019/0283247 A1 * | 9/2019 | Chang | | A61B 5/1121 |
| 2021/0093916 A1 * | 4/2021 | Lowe | | A63C 1/30 |

(Continued)

FOREIGN PATENT DOCUMENTS

| | | | | | |
|---|---|---|---|---|---|
| ES | 1299927 U | * | 5/2023 | | G06F 3/00 |
| JP | 2023058476 A | * | 4/2023 | | A45F 5/155 |
| WO | 2016180952 A1 | | 11/2016 | | |

OTHER PUBLICATIONS

Occupational Safety and Health Administration (OSHA), "Hand Signals for Crane Operation," Federal Register, 2010, vol. 75, No. 152, www.osha.gov/ sites/default/files/laws-regs/federalregister/ 2010-08-09.pdf, 273 pages.

(Continued)

*Primary Examiner* — Chuong P Nguyen
(74) *Attorney, Agent, or Firm* — Meunier Carlin & Curfman LLC

(57) ABSTRACT

An exemplary system and method are disclosed for capturing visual body signals using distance measurements among different parts of the body and for providing classification for them. The exemplary system and method can be employed to generate the classification and provide a second source of communication of the classification to supplement the visual cues provided by such body motion or positioning.

20 Claims, 16 Drawing Sheets

(56) References Cited

U.S. PATENT DOCUMENTS

2022/0160309 A1*   5/2022   Poltorak .............. A61B 5/7264
2024/0345235 A1*  10/2024   Saracevic ............... G01S 7/006
2025/0383436 A1*  12/2025   Ridolfi .................... G01S 7/415

OTHER PUBLICATIONS

Optitrack, 2021, optitrack.com/, 6 pages.

Ordonez et al., "Deep Convolutional and LSTM Recurrent Neural Networks for Multimodal Wearable Activity Recognition," Sensors, 2016, vol. 16, No. 1, pp. 1-25.

Otim et al., "FDTD and empirical exploration of human body and UWB radiation interaction on TOF ranging," IEEE Antennas and Wireless Propagation Letters, 2019, vol. 18, No. 6, pp. 1119-1123.

Otim et al., "Impact of Body Wearable Sensor Positions on UWB Ranging," IEEE Sensors Journal, 2019, vol. 19, No. 23, pp. 11449-11457.

Pang et al., "Deep Anomaly Detection with Deviation Networks," Proceedings of the 25th ACM SIGKDD International Conference on Knowledge Discovery & Data Mining, 2019, pp. 353-362.

Perez, "Alexa developers can now personalize their skills by recognizing the user's voice," Sep. 26, 2019, techcrunch.com/2019/09/ 26/alexa-developers-can-now-personalize-their-skills-by-recognizing-the-users-voice/, 9 pages.

Piergiovanni et al., "Fine-grained Activity Recognition in Baseball Videos," Proceedings of the IEEE Conference on Computer Vision and Pattern Recognition Workshops, 2018, pp. 1853-1861.

Pourbabaee et al., "Deep Convolutional Neural Networks and Learning ECG Features for Screening Paroxysmal Atrial Fibrillation Patients," IEEE Transactions on Systems, Man, and Cybernetics: Systems, 2018, vol. 48, No. 12, pp. 2095-2104.

Raveendranathan et al., "From Modeling to Implementation of Virtual Sensors in Body Sensor Networks," IEEE Sensors Journal, 2011, vol. 12, No. 3, pp. 583-593.

Ravi et al., "A Dataset and Preliminary Results for Umpire Pose Detection Using SVM Classification of Deep Features," 2018 IEEE Symposium Series on Computational Intelligence (SSCI), pp. 1396-1402.

Roetenberg et al., "Xsens MVN: Full 6DOF Human Motion Tracking Using Miniature Inertial Sensors," Xsens Technologies, Apr. 3, 2013, 9 pages.

Roggen et al., "Collecting complex activity datasets in highly rich networked sensor environments," Seventh International Conference on Networked Sensing Systems (INSS), 2010, pp. 233-240.

Ruff et al., "Deep One-Class Classification," International Conference on Machine Learning, 2018, pp. 4393-4402.

Ruff et al., "Deep Semi-Supervised Anomaly Detection," 2019, arXiv preprint arXiv:1906.02694, 23 pages.

Scholkopf et al., "Estimating the Support of a High-Dimensional Distribution," Neural Computation, 2001, vol. 13, No. 7, pp. 1443-1471.

Schultz, "Referee announcements have come a long way in 38 years," Football Zebras, Oct. 18, 2013, 10 pages.

Scovanner et al., "A 3-Dimensional SIFT Descriptor and its Application to Action Recognition," Proceedings of the 15th ACM international Conference on Multimedia, 2007, pp. 357-360.

Simonyan et al., "Two-Stream Convolutional Networks for Action Recognition in Videos," arXiv preprint arXiv:1406.2199, 2014, 11 pages.

Su et al., "Learning Disentangled Behaviour Patterns for Wearable-based Human Activity Recognition," Proceedings of the ACM on Interactive, Mobile, Wearable and Ubiquitous Technologies, Mar. 2022, vol. 6, No. 1, 22 pages.

Sy et al., "Estimating Lower Limb Kinematics using Distance Measurements with a Reduced Wearable Inertial Sensor Count," 2020 42nd Annual International Conference of the IEEE Engineering in Medicine & Biology Society (EMBC), 2020, pp. 4858-4862.

Tax et al., "Support Vector Data Description," Machine Learning, 2004, vol. 54, No. 1, pp. 45-66.

Tian et al., "Weakly-supervised Video Anomaly Detection With Robust Temporal Feature Magnitude Learning," Proceedings of the IEEE/CVF International Conference on Computer Vision (ICCV). 2021, pp. 4975-4986.

Torres et al., "A Hierarchical Model for Recognizing Alarming States in a Batteryless Sensor Alarm Intervention for Preventing Falls in Older People," Pervasive and Mobile Computing, Feb. 2017, vol. 40, pp. 1-16.

Tran et al., "Learning Spatiotemporal Features With 3D Convolutional Networks," Proceedings of the IEEE International Conference on Computer Vision (ICCV), 2015, pp. 4489-4497.

Tu et al., "FedDL: Federated Learning via Dynamic Layer Sharing for Human Activity Recognition," Proceedings of the 19th ACM Conference on Embedded Networked Sensor Systems, Nov. 2021, pp. 15-28.

U.S. Bureau of Labor Statistics, "Labor Force Statistics from the Current Population Survey," 2021, www.bls.gov/cps/cpsaat11.htm, 14 pages.

Vaswani et al., "Attention is All You Need," Advances in Neural Information Processing Systems, 2017, vol. 30, 11 pages.

Vicon, "Vicon motion capture system," 2021, www.vicon.com/, 4 pages.

Wang et al., "Deep Learning for Sensor-based Activity Recognition: A Survey," Pattern Recognition Letters, 2019, vol. 119, pp. 3-11.

Wang et al., "Vision-based hand signal recognition in construction: A feasibility study," Automation in Construction, 2021, vol. 125, No. 103625.

Wikipedia, "Flag semaphore," 2021, en.wikipedia.org/wiki/Flag_ semaphore, 6 pages.

Wikipedia, "List of International Cricket Council members," 2021, en.wikipedia.org/wiki/List_of_International_Cricket_Council_ members, 19 pages.

Wikipedia, "Underway replenishment," 2021, en.wikipedia.org/wiki/ Underway_replenishment, 10 pages.

Yan et al., "Spatial Temporal Graph Convolutional Networks for Skeleton-Based Action Recognition," Thirty-Second AAAI Conference on Artificial Intelligence, 2018, pp. 7444-7452.

Yang et al., "Deep Convolutional Neural Networks on Multichannel Time Series for Human Activity Recognition," Twenty-Fourth iInternational Joint Conference on Artificial Intelligence, 2015, pp. 3995-4001.

Zappi et al., "Activity Recognition from On-Body Sensors: Accuracy-Power Trade-Off by Dynamic Sensor Selection," European Conference on Wireless Sensor Networks, 2008, pp. 17-33.

Zemgulys et al., "Recognition of basketball referee signals from real-time videos," Journal of Ambient Intelligence and Humanized Computing, 2020, vol. 11, No. 3, pp. 979-991.

Zemgulys et al., "Recognition of basketball referee signals from videos using Histogram of Oriented Gradients (HOG) and Support Vector Machine (SVM)," Procedia Computer Science, 2018, vol. 130, pp. 953-960.

Zeng et al., "Convolutional Neural Networks for Human Activity Recognition using Mobile Sensors," 6th International Conference on Mobile Computing, Applications and Services, 2014, pp. 197-205.

Zhang et al., "Human Daily Activity Recognition With Sparse Representation Using Wearable Sensors," IEEE Journal of Biomedical and Health Informatics, May 2013, vol. 17, No. 3, pp. 553-560.

Zheng et al., "Time Series Classification Using Multi-Channels Deep Convolutional Neural Networks," International Conference on Web-Age Information Management, 2014, pp. 298-310.

Zhou et al., "Learning on the Rings: Self-Supervised 3D Finger Motion Tracking Using Wearable Sensors," Proceedings of the ACM on Interactive, Mobile, Wearable and Ubiquitous Technologies, Jun. 2022, vol. 6, No. 2, pp. 1-31.

"Crane Operation and Routine Safety Procedures," Marine Construction Magazine, 2020, https://marineconstructionmagazine.com/ safety/crane-operation-and-routine-safety-procedures/, 12 pages.

"IEEE Standard for Low-Rate Wireless Networks," IEEE Std 802.15.4-2015, 2016, pp. 1-709.

"Taxiing Accident involving Arrow Air APWP6L McDonnell Douglas DC8-62 Registration Mark: N1808E at Singapore Changi Airport on Feb. 28, 2002," Ministry of Transport, Singapore, Jun. 1,

(56)                    References Cited

OTHER PUBLICATIONS 2004, www.mot.gov.sg/docs/default-source/about-mot/investigation-report/28- feb-2002.pdf, 61 pages.

Abedin et al., "Attend and Discriminate: Beyond the State-of-the-Art for Human Activity Recognition using Wearable Sensors," arXiv, 2020, 2007.07172, 15 pages.

Americrane & Hoist Corporation, 2021, "Crane Operator Hand Signals and their Importance," 2023, www.amchoist.com/news/crane-operator-hand-signals-and-their-importance-46177, 9 pages.

Anderson, "Mobile Gait Analysis Using Foot-Mounted UWB Sensors," Proceedings of the ACM on Interactive, Mobile, Wearable and Ubiquitous Technologies, Sep. 2019, vol. 3, No. 3, pp. 1-22.

Bao et al., "Activity Recognition from User-AnnotatedAacceleration Data," International Conference on Pervasive Computing, 2004, pp. 1-17.

BBC Sport, "The umpire's signals," 2021, http://news.bbc.co.uk/sportacademy/hi/sa/cricket/rules/umpire_signals/newsid_3809000/3809867.stm, 1 page.

Bedico, "Gesture Recognition of Basketball Referee Violation Signal by Applying Dynamic Time Warping Algorithm Using a Wearable Device," Fourth International Conference on Computing Methodologies and Communication (ICCMC), 2020, pp. 249-254.

Bhattacharya, "Gesture Classification with Machine Learning Using Kinect Sensor Data," Third International Conference on Emerging Applications of Information Technology, 2012, pp. 348-351.

Bilen et al., "Dynamic Image Networks for Action Recognition," IEEE Conference on Computer Vision and Pattern Recognition (CVPR), 2016, pp. 3034-3042.

Bulling et al., "Multimodal Recognition of Reading Activity in Transit Using Body-Worn Sensors," ACM Transactions on Applied Perception (TAP), Mar. 2012, vol. 9, No. 1, pp. 1-21.

Cao et al., "Realtime Multi-Person 2d Pose Estimation using Part Affinity Fields," IEEE Conference on Computer Vision and Pattern Recognition, 2017, pp. 7291-7299.

Cecotti et al., "Convolutional Neural Networks for P300 Detection with Application to Brain-Computer Interfaces," IEEE Transactions on Pattern Analysis and Machine Intelligence, 2011, vol. 33, No. 3, pp. 433-445.

CyberGlove Systems LLC, www.cyberglovesystems.com/, 2021, 4 pages.

Dalal et al.. "Histograms of Oriented Gradients for Human Detection," IEEE Computer Society Conference on Computer Vision and Pattern Recognition (CVPR'05), 2005, vol. 1, pp. 886-893.

Decawave Ltd., "DW1000 User Manual," 2017, www.decawave.com/sites/default/files/resources/dw1000_user_manual_2.11.pdf, 242 pages.

Dempster, "The Anthropometry of Body Action," Annals of the New York Academy of Sciences 63 (4 Dynamic Anthropometry), Blackwell Publishing, 1955, pp. 559-585.

Feichtenhofer et al., "Convolutional Two-Stream Network Fusion for Video Action Recognition," IEEE Conference on Computer Vision and Pattern Recognition, 2016, pp. 1933-1941.

Feichtenhofer et al., "SlowFast Networks for Video Recognition," IEEE/CVF International Conference on Computer Vision (ICCV), 2019, pp. 6202-6211.

Fifth Dimension Technologies, "5DT Data Glove Ultra—5DT," 2021, 5dt.com/5dt-data-glove-ultra/, 12 pages.

Gan Khoon Lay, "Cricket Umpire,", 2021, https://thenounproject.com/icon/cricket-umpire-2744209/, 4 pages.

Green, "N-way time transfer ('NWTT') method for cooperative ranging," Contribution 802.15-05-0499-00-004a to the IEEE 802.15. 4a Ranging Subcommittee, 2005.

Guan et al., "Ensembles of Deep LSTM Learners for Activity Recognition using Wearables," Proceedings of the ACM on Interactive, Mobile, Wearable and Ubiquitous Technologies, 2017, vol. 1, No. 2, pp. 1-28.

Hari et al., "Event detection in cricket videos using intensity projection profile of Umpire gestures," Annual IEEE India Conference (INDICON), 2014, pp. 1-6.

Hofmueller et al., "The Transmission of IP Datagrams over the Semaphore Flag Signaling System (SFSS)," 2007, datatracker.ietf.org/doc/html/rfc4824, 13 pages.

Hossain et al., "DeActive: Scaling Activity Recognition with Active Deep Learning," ACM on Interactive, Mobile, Wearable and Ubiquitous Technologies, Jun. 2018, vol. 2, No. 2, pp. 1-23.

Huang et al., "Deep Inertial Poser: Learning to Reconstruct Human Pose from Sparse Inertial Measurements in Real Time," ACM Transactions on Graphics (TOG), Nov. 2018, vol. 37, No. 6, pp. 1-15.

IEEE, "IEEE Standard for Low-Rate Wireless Networks— Amendment 1: Enhanced Ultra Wideband (UWB) Physical Layers (PHYs) and Associated Ranging Techniques. IEEE Std 802.15.4z-2020 (Amendment to IEEE Std 802.15.4-2020)", 2020, pp. 1-174.

International Civil Aviation Organization, "Rules of the Air— Annex 2", Jul. 2005, 10th Edition, 74 pages, https://www.icao.int/Meetings/anconf12/Document%20Archive/an02_cons%5B1%5D.pdf.

Jeyakumar et al., "SenseHAR: A Robust Virtual Activity Sensor for Smartphones and Wearables," 17th Conference on Embedded Networked Sensor Systems, 2019, pp. 15-28.

Jimenez et al., "Comparing Decawave and Bespoon UWB location systems: indoor/outdoor performance analysis," 2016 International Conference on Indoor Positioning and Indoor Navigation (IPIN), 2016, pp. 1-8.

Klaser et al., "A Spatio-Temporal Descriptor Based on 3D-Gradients," BMVC 2008—19th British Machine Vision Conference, Sep. 2008, 10 pages.

Ko et al., "Online Context Recognition in Multisensor Systems using Dynamic Time Warping," 2005 International Conference on Intelligent Sensors, Sensor Networks and Information Processing (ISSNIP), 2005, pp. 283-288.

Kwapisz et al., "Activity Recognition using Cell Phone Accelerometers," ACM SigKDD Explorations Newsletter, 2011, vol. 12, No. 2, pp. 74-82.

Laptev et al., "Learning realistic human actions from movies," 2008 IEEE Conference on Computer Vision and Pattern Recognition, 2008, pp. 1-8.

Lara et al., "Centinela: A human activity recognition system based on acceleration and vital sign data," Pervasive and Mobile Computing, 2012, vol. 8, No. 5, pp. 717-729.

Larson, "Google Home now recognizes your individual voice," CNN, Apr. 20, 2017, money.cnn.com/2017/04/20/technology/google-home- voice-recognition/index.html, 4 pages.

Liu et al., "Disentangling and Unifying Graph Convolutions for Skeleton-Based Action Recognition," Proceedings of the IEEE/CVF Conference on Computer Vision and Pattern Recognition (CVPR), 2020, pp. 143-152.

Liu et al., "NeuroPose: 3D Hand Pose Tracking using EMG Wearables," Proceedings of the World Wide Web Conference 2021, pp. 1471-1482.

Mankiewicz et al., "Incremental real-time personalization in human activity recognition using domain adaptive batch normalization," Proceedings of the ACM on Interactive, Mobile, Wearable and Ubiquitous Technologies, 2020, vol. 4, No. 4, pp. 1-20.

Manus VR, "Industry leading VR techology—Manus VR," 2021, www.manus-vr.com/, 8 pages.

Marcard et al., "Sparse Inertial Poser: Automatic 3D Human Pose Estimation from Sparse IMUs," Computer Graphics Forum, 2017, vol. 36, No. 2, pp. 349-360.

Merriaux et al., "A Study of Vicon System Positioning Performance," Sensors, 2017, vol. 17, No. 1591, pp. 1-18.

Mohseni et al., "Self-Supervised Learning for Generalizable Out-of-Distribution Detection," Proceedings of the 34th AAAI Conference on Artificial Intelligence, 2020, pp. 5216-5223.

Murahari et al., "On Attention Models for Human Activity Recognition," Proceedings of the 2018 ACM international symposium on wearable computers, 2018, pp. 100-103.

NFHS, "Football official signals," 2023, https://www.nfhs.org/media/4016213/2023-nfhs-official-football-signals-final.pdf, 2 pages.

(56)         References Cited

OTHER PUBLICATIONS

NFHS, "Official NFHS Baseball Signals," 2023, https://www.nfhs.
org/media/1017816/nfhs-baseball-signal-chart_2023.pdf, 2 pages.

* cited by examiner

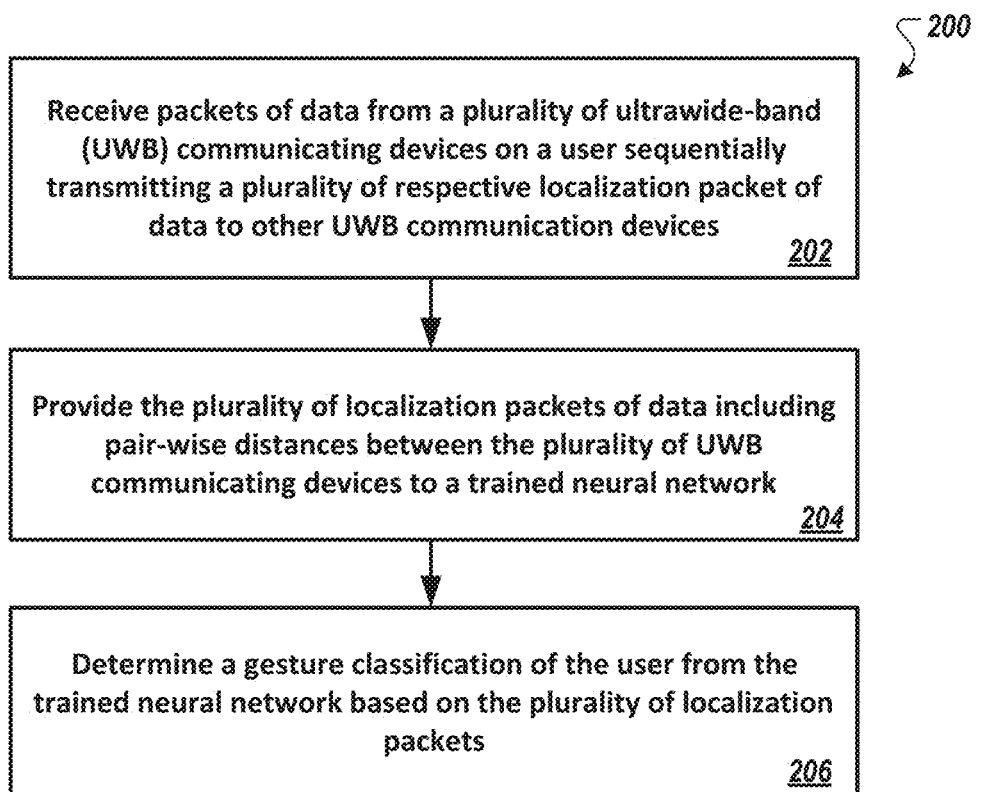

*200*

Receive packets of data from a plurality of ultrawide-band (UWB) communicating devices on a user sequentially transmitting a plurality of respective localization packet of data to other UWB communication devices
202

Provide the plurality of localization packets of data including pair-wise distances between the plurality of UWB communicating devices to a trained neural network
204

Determine a gesture classification of the user from the trained neural network based on the plurality of localization packets
206

*FIG. 2*

Records   Media   Audience   Feedback

Client-end applications

Automatic body signal interpretation system

On-body sensors transmit raw data

Signaling

Baseball Umpire Signals

Count   Foul Tip

Flag Semaphore

Attention   A   B

Crane Operator Signals

Hold   Lower Boom   Stop   Raise Boom

Cricket Umpire Signals

Leg Bye   Boundary 4   Bye   Dead Ball   Wide   Out   No Ball   Leg On

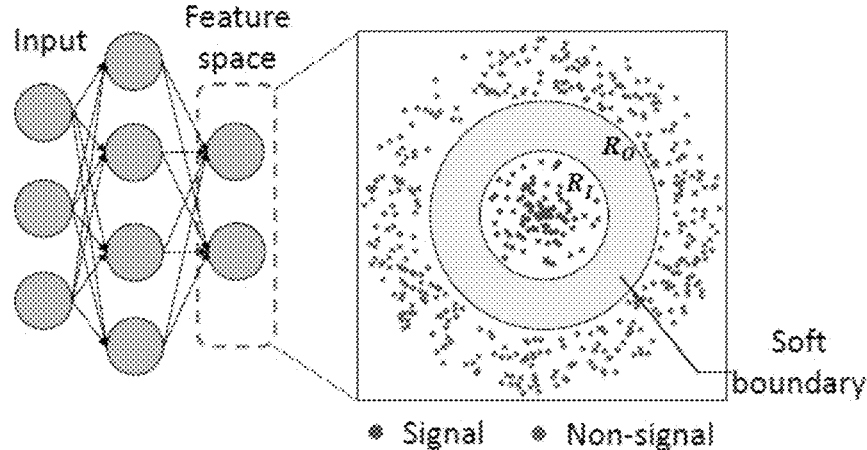
FIG. 5
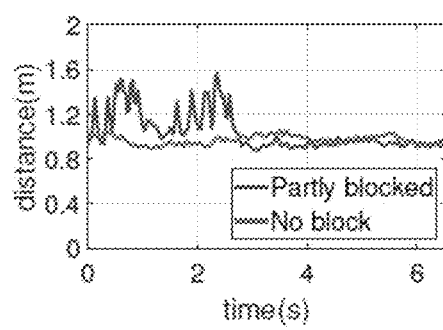
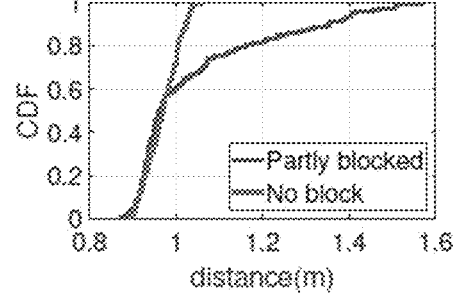
FIG. 6
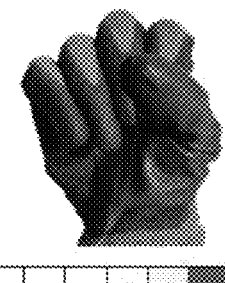
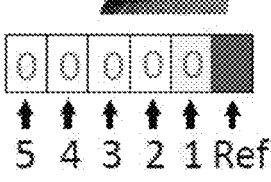
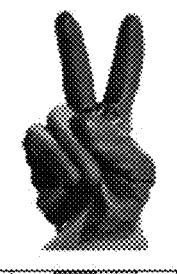
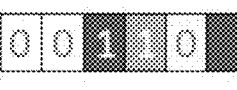
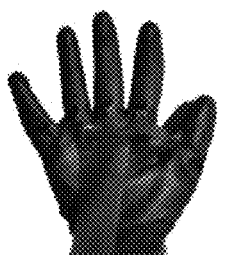
FIG. 7

ON-BODY SENSOR SYSTEM AND METHOD FOR AUTOMATIC INTERPRETATION OF VISUAL BODY SIGNALS

CROSS REFERENCE TO RELATED APPLICATIONS

This application claims the benefit of U.S. Provisional Application No. 63/338,195 filed May 4, 2022, the disclosure of which is hereby incorporated by reference in its entirety.

GOVERNMENT SUPPORT CLAUSE

This invention was made with government support under Grant No. CNS-2031868 and 2145278 from the National Science Foundation. The government has certain rights in the invention.

BACKGROUND

Visual body signals are hand gestures or specific body postures that are individually communicated as messages in a variety of fields, such as sports, construction, and transportation. Over 600,000 people directly use visual body signal on a regular basis in the United States. According to the 2021 Labor Force Statistics, this includes around 360,000 construction equipment operators, around 158,000 aircraft pilots and flight engineers, around 31,000 airfield operations specialists, around 51,000 crossing guards and flaggers, and around 17,000 umpires and referees. Body signals have several benefits: (1) body signals are language agnostic and universal; (2) they can be used in very loud environments such as at construction sites and at airports, where audio communication can be challenging; (3) body signals work even at fairly large distances without requiring a communication channel to be established beforehand, such as in the case of pilots taxiing at an airport.

There is a benefit to recognizing body signals. Conventional gesture recognition system performs visual detection using camera images or videos. These types of gesture-classifying architectures can be limited by the position of the user within the camera's field of view, e.g., when only low-resolution images are available. Furthermore, visual systems often employ expensive equipment or have a slow data processing rate due to their complexity.

There is thus a benefit to improving visual body signal classification.

SUMMARY

An exemplary system and method are disclosed for capturing, while a person is making visual cues, on-body signals using distance measurements derived from communication between on-body devices placed at different parts of the body via an external listener that passively acquires the distance measurement for classification of the visual body signals. The communication, e.g., as ultrawide-band (UWB), may include time-of-flight (TOF) or other timing-associated information from which distance measurements can be derived. The communication may include, in some embodiments, other sensor data that may be additional employed to provide body orientation and finger configuration information. The exemplary system and method, via the external listener, can employ the acquired on-board body signals in a trained machine learning system to generate the classification outputs to record or supplement the visual cues. Ultra-wideband can use a very low energy level for short-range and provide high-bandwidth, low-latency communications over a portion of the radio spectrum that are thus less susceptible to interference and suitable for real-time operation.

The exemplary system and method may employ a number of wireless distance measurement sensors (e.g., 6 sensors), e.g., configured with ultrawide-band (UWB) transceivers, and additionally configured with inertial sensors to measure body location signals and finger location signals. A user can wear the UWB sensors on each wrist, each ankle, on the chest, and on a cap on the head and a glove having the IMU over the hand. The sensors can measure the distance from each other to which a pose can be determined per an approximate understanding of the pose via the trained ML operation. This pose can be translated into different visual body signals such as those given by umpires and referees in a sports match or those used by construction workers to signal commands to each other in noisy environments.

The exemplary system and method may employ a fast software pipeline operation to obtain pair-wise distance measurements and broadcast them, e.g., along with inertial measurement unit (IMU) sensor and sensor data (e.g., photodiode data) to external devices, which is then listened-in upon by the external listener.

The exemplary system and method may employ machine learning-based algorithms (e.g., ML-based fusion algorithms) to identify the obtained body signals based on UWB, IMU, and/or finger configuration data.

The exemplary system and method can be employed to record the body actions of sporting professionals (e.g., umpire or referee). The exemplary system and method can be employed with data recorders to record body actions of critical actors such as pilots, train engineers, bus drivers, crane operators, and law enforcement officials to aid in the investigations of accidents or incidents.

In an aspect, a system is disclosed comprising a plurality of ultrawide-band (UWB) communicating devices configured to be communicatively arranged as a plurality of nodes in a mesh configuration (e.g., all-to-all network), wherein the plurality of UWB communicating devices includes a first UWB communicating device configured to sequentially transmit in each of a plurality of messaging cycles, a first localization packet of data to each of the other plurality of UWB communicating devices, including a second UWB communicating device, wherein the first UWB communicating device and the second UWB communicating device are configured to determine time associated values corresponding to receipts of the transmitted localization packets (e.g., time of flight (ToF)) sent from the other UWB communicating devices, wherein the determined time associated value is included in the first localization packet, wherein the first UWB communicating device and second UWB communicating device are configured to be positioned at a plurality of spaced apart locations on a user, including at a first body location and a second body location; and a local controller placed in proximity to the plurality of UWB communicating devices (e.g., in a work area or as a wearable device), the local controller as a listening device is configured to (i) passively collect the localization packets sequentially transmitted by the respective UWB communicating devices and (ii) determine pair-wise distances between each respective pairs formed of the plurality of UWB communicating devices using the passively collected localization packets, wherein the collected localization packets including the pair-wise distances are used in a trained machine learning classifier model to determine a gesture classification of the user (e.g., for interpreting and communicating body signals, body recognition in virtual or augmented reality, controlling robotic operations).

In some embodiments, the plurality of UWB communicating devices include at least six UWB communicating devices to provide the gesture classification for whole-body and activity classification.

In some embodiments, at least one of the plurality of UWB communicating devices includes an inertial measurement unit (IMU) sensor.

In some embodiments, the system further includes at least one IMU sensor configured to be communicatively coupled to at least one of the plurality of UWB communicating devices, wherein the communicatively coupled UWB communicating device is configured to transmit IMU data of the IMU sensor in the localization packet.

In some embodiments, at least one of the plurality of UWB communicating devices includes one or more finger sensors for determining a conformational state for a finger of the user (e.g., using optical sensors, magnetic sensors, and/or capacitive sensors).

In some embodiments, the system further includes one or more finger sensors configured to be communicatively coupled to at least one of the plurality of UWB communicating devices for determining a conformational state for a finger of the user (e.g., using optical sensors, magnetic sensors, and/or capacitive sensors), wherein the communicatively coupled UWB communicating device is configured to transmit measurements from the one or more finger sensors in the localization packets.

In some embodiments, the trained machine learning classifier model includes a recurrent neural network (RNN).

In some embodiments, the local controller is configured to execute the trained machine learning classifier model (e.g., a recurrent neural network (RNN)) using the collected localization packets and output the gesture classification of the user.

In some embodiments, the local controller is configured to transmit the collected localization packets including the pair-wise distances to an external device (e.g., cloud, smart phone tethered to the local controller), wherein the external device is configured to execute the trained machine learning classifier model to determine the gesture classification.

In some embodiments, the at least six UWB communicating devices are adapted in a sensing configuration to be placed at six spaced-apart body locations on the user, including at a first wrist or hand, a second wrist or hand, a first ankle or foot, a second ankle or foot, a head or neck, and a torso of the user, and wherein the sensing configuration provides for whole body gesture evaluation.

In another aspect, a computer readable medium is disclosed having instructions stored thereon for the classification of body gestures of a user, wherein the instructions, when executed by a processor, cause the processor to: receive, on a local controller placed in proximity to a plurality of ultrawide-band (UWB) communicating devices (e.g., in a work area or as a wearable device), packets of data from each of the plurality of UWB communication devices arranged as a plurality of nodes in a mesh configuration (e.g., all-to-all network), wherein the plurality of UWB communicating devices includes a first UWB communicating device configured to sequentially transmit in each of a plurality of messaging cycles, a first localization packet of data to each of the other plurality of UWB communicating devices, including a second UWB communicating device, wherein the first UWB communicating device and the second UWB communicating device are configured to determine time associated values corresponding to receipts of the transmitted localization packets (e.g., time of flight (ToF)) sent from the other UWB communicating devices, wherein the determined time associated value is included in the first localization packet, wherein the first UWB communicating device and second UWB communicating device are configured to be positioned at a plurality of spaced apart locations on a user, including at a first body location and a second body location; and determine pair-wise distances between each respective pairs formed of the plurality of UWB communicating devices using the collected localization packets, wherein the collected localization packets including the pair-wise distances are used in a trained machine learning classifier model to determine a gesture classification of the user.

In some embodiments, the plurality of UWB communicating devices further include at least one IMU sensor configured to be communicatively coupled to at least one of the plurality of UWB communicating devices, wherein the instructions executed by the processor further cause the communicatively coupled UWB communicating device to transmit IMU data of the IMU sensor in the localization packet.

In some embodiments, the trained machine learning classifier model includes a recurrent neural network (RNN).

In some embodiments, the instructions when executed further cause the local controller to execute the trained machine learning classifier model (e.g., a recurrent neural network (RNN)) using the collected localization packets and output the gesture classification of the user.

In some embodiments, the instructions when executed further cause the local controller to transmit the collected localization packets including the pair-wise distances to an external device (e.g., cloud, smart phone tethered to the local controller), wherein the external device is configured to execute the trained machine learning classifier model to determine the gesture classification.

In another aspect, a method is disclosed for classifying body gestures of a user, the method comprising: receiving, on a local controller placed in proximity to a plurality of ultrawide-band (UWB) communicating devices (e.g., in a work area or as a wearable device), packets of data from each of the plurality of UWB communication devices arranged as a plurality of nodes in a mesh configuration (e.g., all-to-all network), wherein the plurality of UWB communicating devices includes a first UWB communicating device that sequentially transmits in each of a plurality of messaging cycles, a first localization packet of data to each of the other plurality of UWB communicating devices, including a second UWB communicating device, wherein the first UWB communicating device and the second UWB communicating device determine time associated values corresponding to receipts of the transmitted localization packets (e.g., time of flight (ToF)) sent from the other UWB communicating devices, wherein the determined time associated value is included in the first localization packet, wherein the first UWB communicating device and second UWB communicating device are positioned at a plurality of spaced apart locations on a user, including at a first body location and a second body location; and determining pair-wise distances between each respective pairs formed of the plurality of UWB communicating devices using the passively collected localization packets, wherein the collected localization packets including the pair-wise distances are used in a trained machine learning classifier model to determine a gesture classification of the user.

In some embodiments, the plurality of UWB communicating devices further include at least one IMU sensor communicatively coupled to at least one of the plurality of UWB communicating devices, wherein the communicatively coupled UWB communicating device transmit IMU data of the IMU sensor in the localization packet.

In some embodiments, the trained machine learning classifier model includes a recurrent neural network (RNN).

In some embodiments, the body gestures of the user are associated with sport-related gestures, wherein the training data set for the trained machine learning classifier model includes sport-associated call signals.

In some embodiments, the body gestures of the user are associated with warehouse or signaling-associated gestures (e.g., aircraft signaling), wherein the training data set for the trained machine learning classifier model includes warehouse or signaling-associated body gestures.

BRIEF DESCRIPTION OF THE DRAWINGS

The accompanying drawings, which are incorporated in and constitute a part of this specification, illustrate embodiments and, together with the description, serve to explain the principles of the methods and systems.

FIG. 2 shows an example method to determine a gesture classification using localization data from a plurality of UWB communicating devices according to an illustrative embodiment.

FIG. 5 shows a soft boundary buffer to separate signals and non-signals in the Exemplary System.

FIG. 6 shows the "short run" cricket signal (left); distance measurement: Time-series (middle), and CDF (right).

FIG. 7 shows the light intensity of different finger signs.

6

Figure 15:
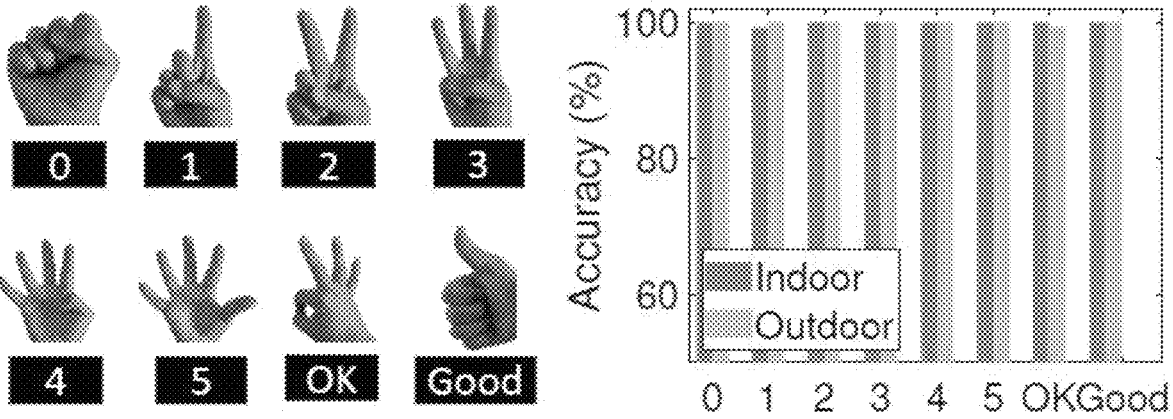

FIG. 15 shows 8 tested finger signs and the performance of FSR in indoor and outdoor scenarios.

Figure 16:
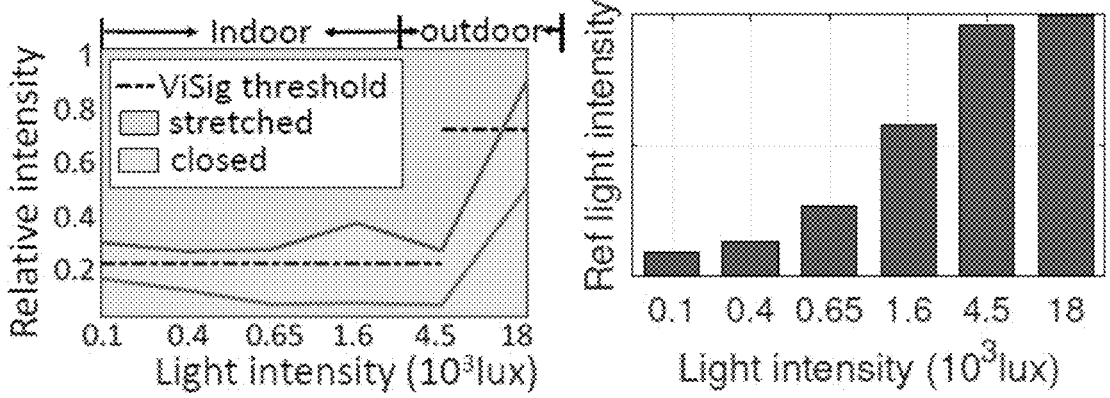

FIG. 16 shows threshold ranges in FSR (left); The measured reference light intensity (right).

Figure 17:
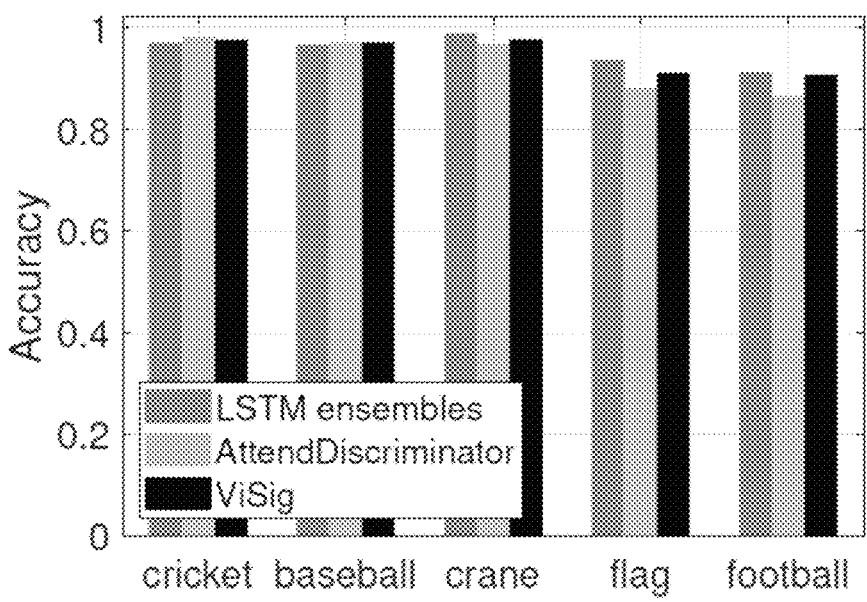

FIG. 17 shows the classification accuracy of different neural network models.

Figure 18:
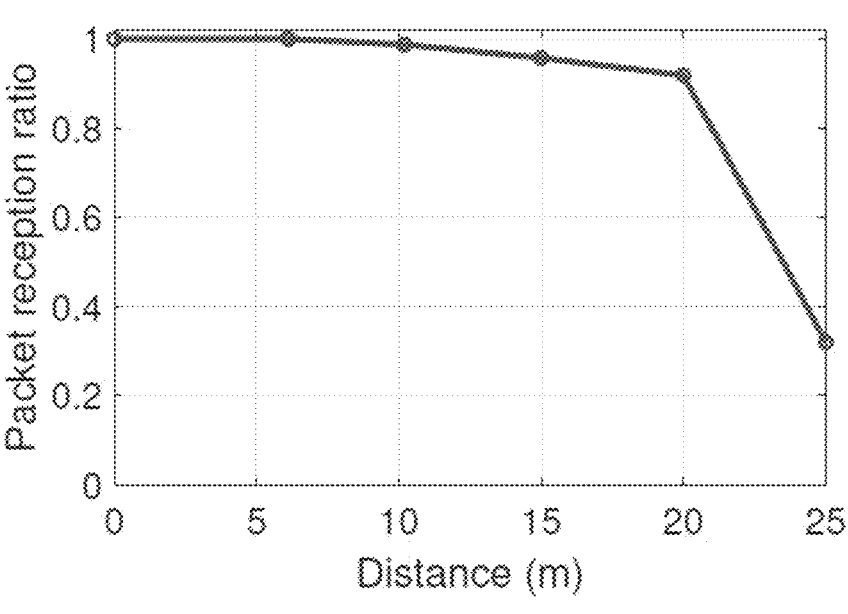

FIG. 18 shows the packet reception ratio at different distances in the indoor and outdoor environments.

Figure 19:
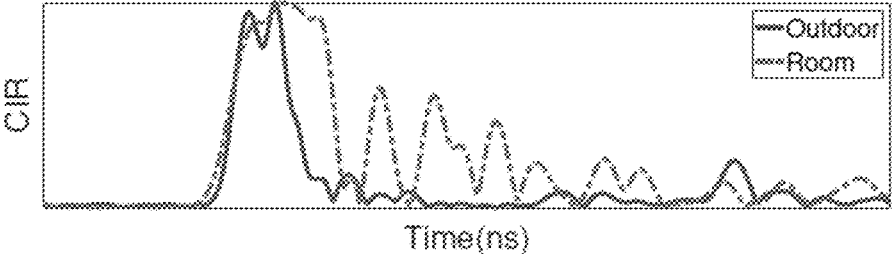

FIG. 19 shows an example CIR in the outdoor and room environment.

DETAILED DESCRIPTION

Each and every feature described herein, and each and every combination of two or more of such features, is included within the scope of the present invention provided that the features included in such a combination are not mutually inconsistent.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the nth reference in the list. All references cited and discussed in this specification are incorporated herein by reference in their entireties and to the same extent as if each reference was individually incorporated by reference.

Definitions

As used herein, the term "pair-wise distance" refers to a Euclidean distance between a corresponding pair of UWB devices in a system.

The term "UWB data" as used herein refers to measurements collected by a UWB sensor or derived therefrom. Example types of UWB data include time-of-flight (ToF) measurements and pairwise distances.

As used herein, the term "IMU data" broadly includes IMU acceleration information, IMU angular velocity information, and other recordable information measured or indirectly obtained from an IMU sensor.

Example System

Figure 1A:
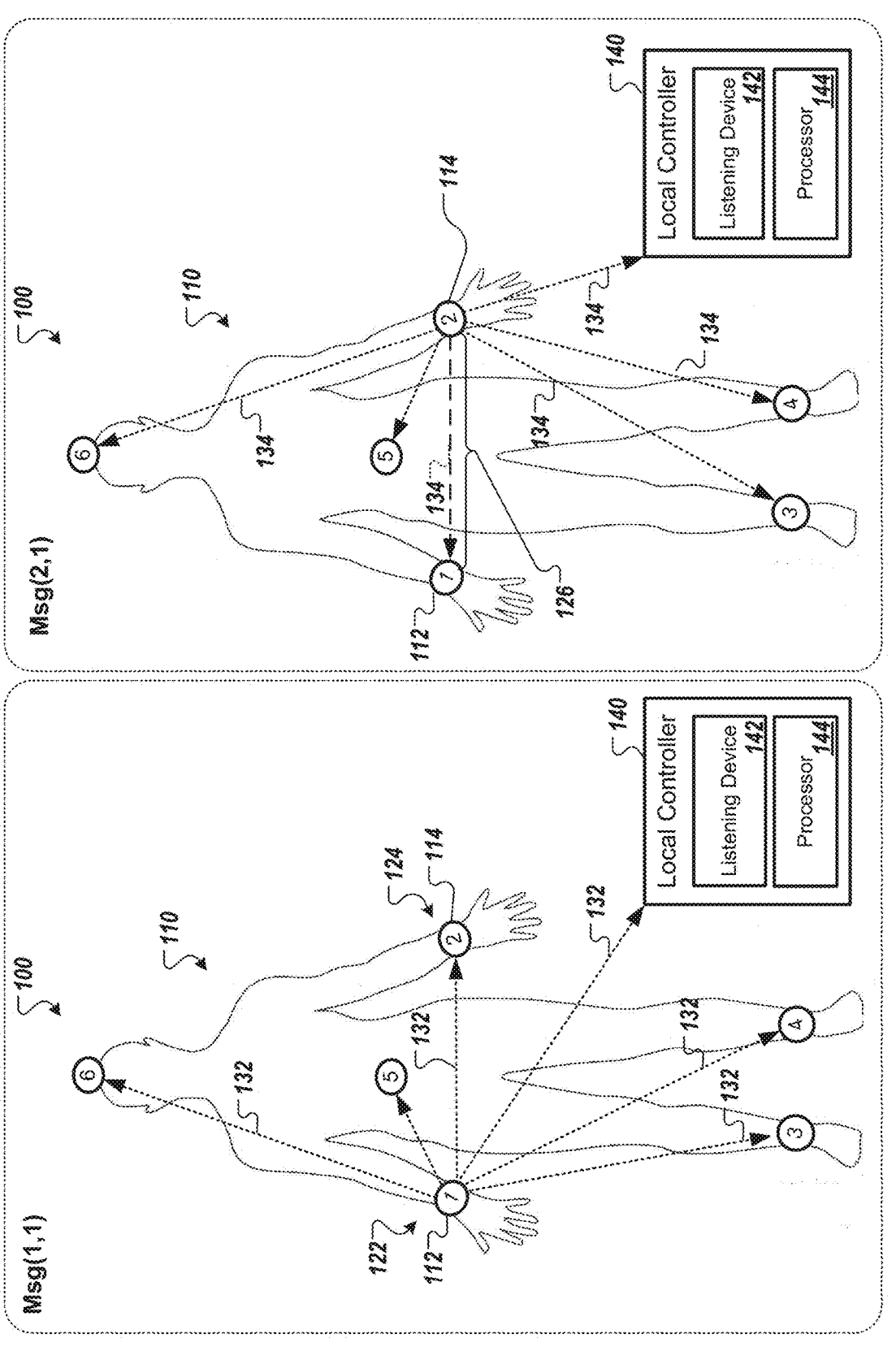
FIGS. 1A-1B depict diagrams of an example system having ultrawide-band (UWB) communication devices configured with a neural network to determine predicted gesture classifications in accordance with an illustrative embodiment.
Figure 1B:
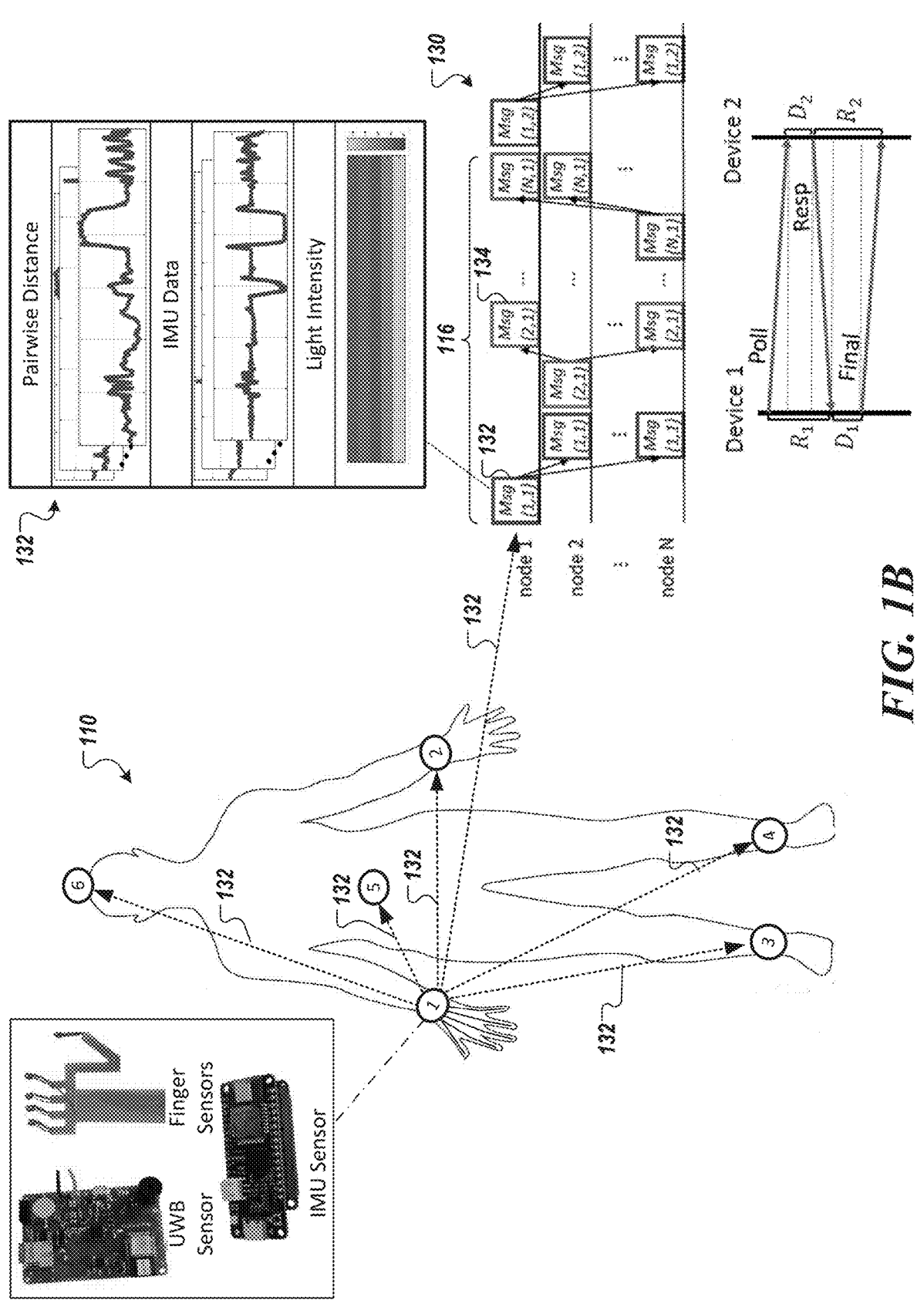

FIGS. 1A-1B each show a diagram of an example system 100 configured to determine a classification gesture of a user in accordance with an illustrative example.

In the example shown in FIG. 1A, the system 100 includes a plurality of ultrawide-band (UWB) communicating devices 110 configured to be communicatively arranged as a plurality of nodes in a mesh configuration (e.g., all-to-all network). The plurality of UWB communicating devices 110 includes a first UWB communicating device 112 configured to sequentially transmit in each of a plurality of messaging cycles 116, a first localization packet of data 132 to each of the other plurality of UWB communicating devices 110. The term "sequentially transmit" as used herein refers to a turn order of transmission of the respective localization packets between each of the plurality of UWB communicating devices in a messaging cycle. For example, the first UWB communicating device can transmit a first packet of data to all other UWB communicating devices. When the first packet of data is received, a second UWB communicating device can then transmit a second packet of data to each of the other UWB communicating devices.

The plurality of UWB communicating devices 110 also includes a second UWB communicating device 114. The first UWB communicating device 112 and the second UWB communicating device 114 are configured to determine time associated values corresponding to receipts of the transmitted localization packets 130 (e.g., time of flight (ToF)) sent from the other UWB communicating devices 110. The determined time-associated value is included in the first localization packet 132. In system 100 shown in FIG. 1A, the first UWB communicating device 112 and second UWB communicating device 114 are further configured to be positioned at a plurality of spaced apart locations on a user, including at a first body location 122 and a second body location 124. The system 100 shown in FIGS. 1A and 1B depicts six communicating devices 110 (labeled as 1-6) adapted to be spaced at various body locations of the user when in use. The six UWB communicating devices shown in FIGS. 1A-1D are adapted in a sensing configuration to be placed at six spaced-apart body locations on the user, including at a first wrist or hand, a second wrist or hand, a first ankle or foot, a second ankle or foot, a head or neck, and a torso of the user. The use of six UWB communicating devices in various implementations can provide gesture classification for whole-body and activity classification.

Referring now to FIG. 1B, the first UWB communicating device 112 further includes an inertial measurement unit (IMU) sensor. The IMU sensor is configured to be communicatively coupled to the first UWB communicating device 112 such that the communicatively coupled first UWB communicating device 112 can transmit IMU data of the IMU sensor in the first localization packet 132. The first UWB communicating device 112 further includes finger sensors for determining a conformational state for a finger of the user. The finger sensors are communicatively coupled to the first UWB communicating device 112 such that the communicatively coupled first UWB communicating device 112 can transmit measurements from the finger sensors in the first localization packet 132.

The system 100 further includes a local controller 140 placed in proximity to the plurality of UWB communicating devices 110 (e.g., in a work area or as a wearable device). The local controller 140 includes a listening device 142 and is configured to (i) passively collect the plurality of localization packets 130 sequentially transmitted by the respective UWB communicating devices 110 and (ii) determine pair-wise distances between each respective pairs formed of the plurality of UWB communicating devices using the passively collected localization packets 130.

Figure 1C:
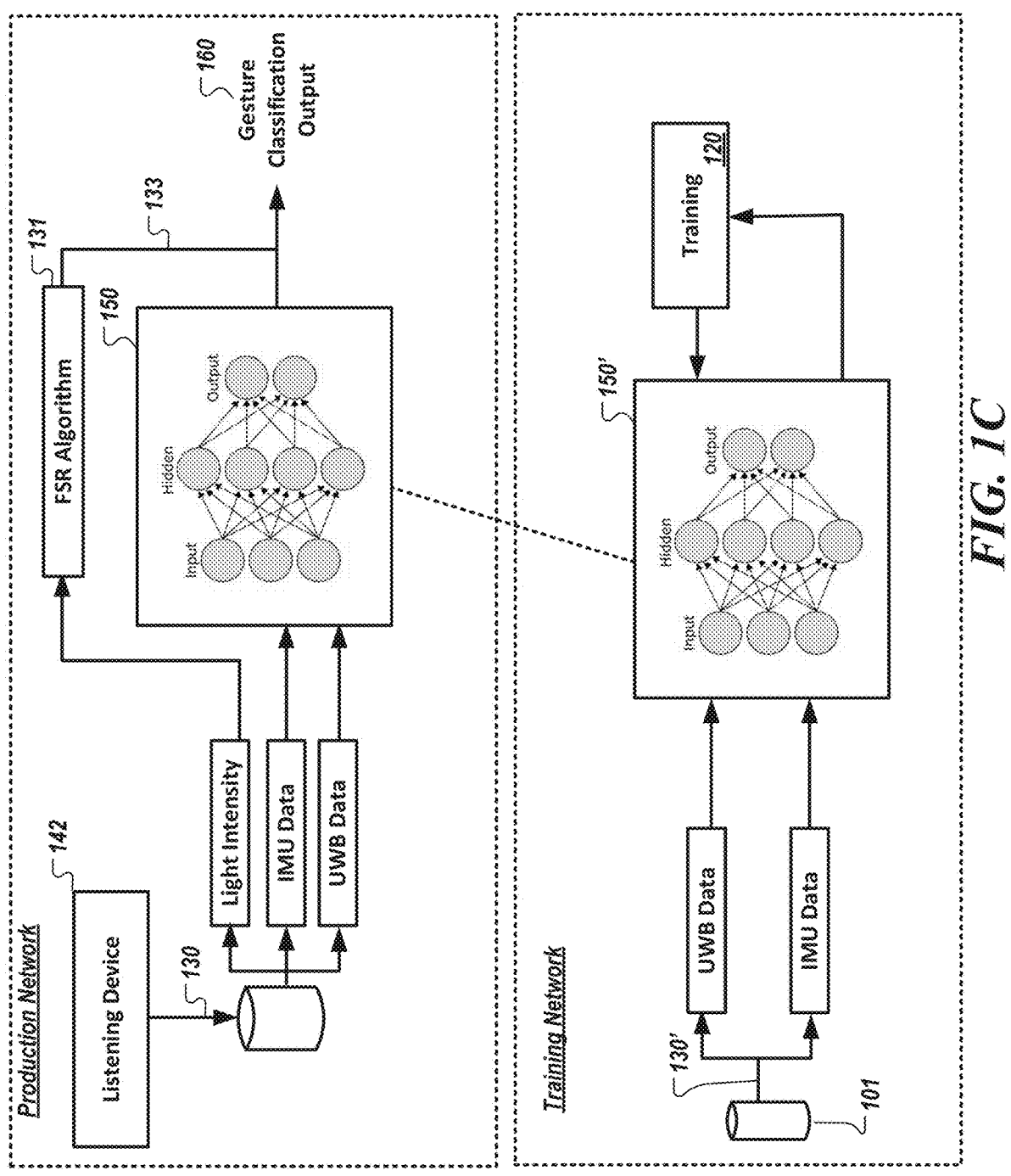
FIGS. 1C, 1D each show an example system architecture for training and deploying a machine learning model to determine gesture classification outputs.
Figure 1D:
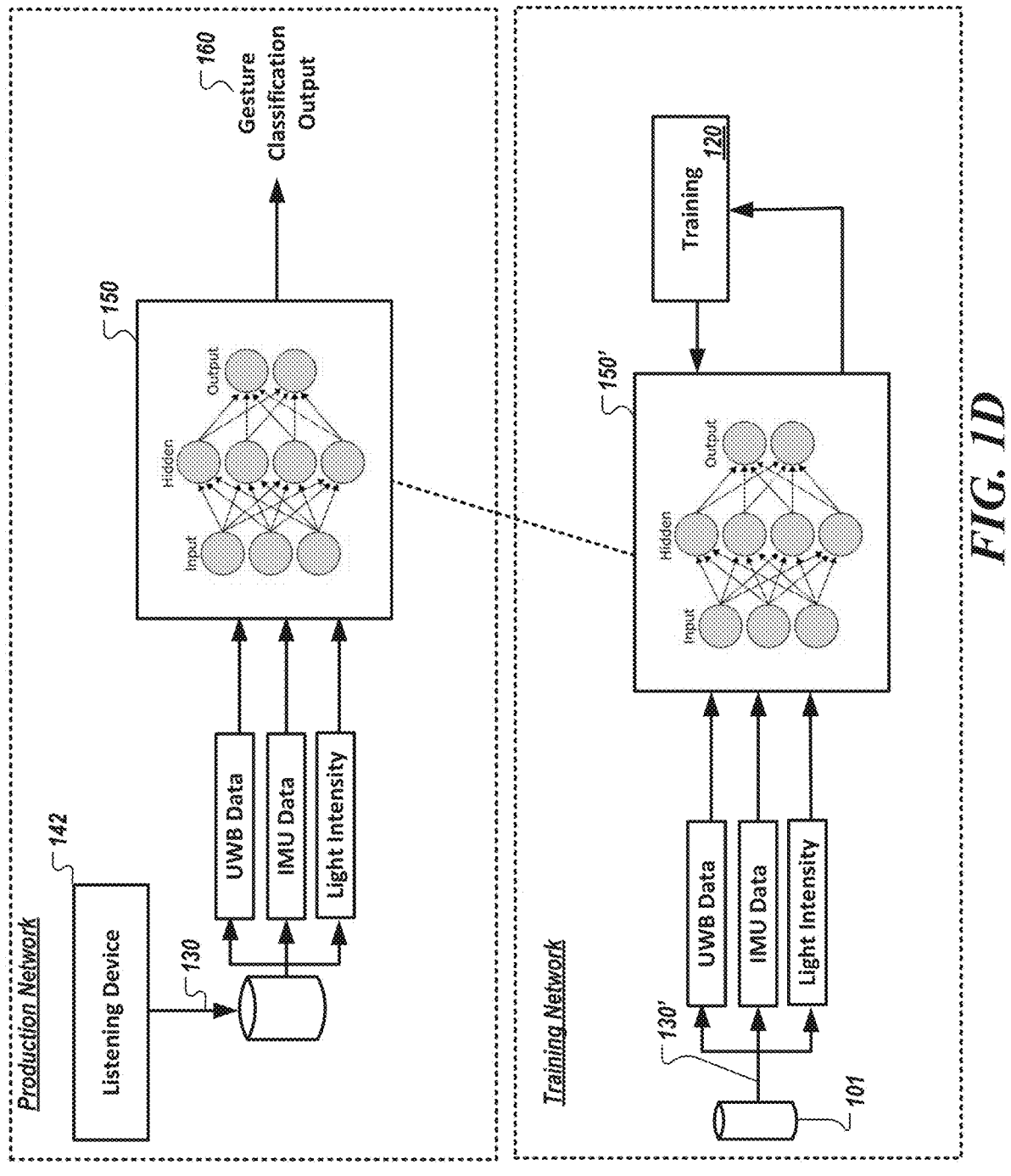

FIGS. 1C-1D each show system diagrams for training and deploying a neural network for determining gesture classifications.

Referring to FIG. 1C, the system includes a training network and a production network. The training network includes a data store 101 which provides a plurality of training localization packets 130' to a neural network 150' (e.g., an RNN). The plurality of training localization packets 130' includes UWB data and IMU data. The neural network 150' is trained using the plurality of training localization packets 130'. The training operation after the fully connected layer 120, in the provided example, is configured to employ conventional operations, e.g., according to RNN, e.g., employing gradient descent and various normalization operations, and thus are not further described herein. Other training operations may be employed.

The production network includes a trained neural network 150 configured to receive a plurality of collected localization packets 130. The plurality of collected localization packets 130 include UWB data, IMU data, and light intensity data from one or more finger sensors. The system further includes a finger signal recognition (FSR) algorithm 131. The FSR algorithm receives the light intensity data from collected localization packets 130 and generates a vector of probabilities that the given data corresponds to a certain signal and returns the signal with the highest probability as the output. Thus, the FSR algorithm 131 is able to distinguish between signals having similar body poses but with different finger states. When the trained neural network 150 receives the UWB data and IMU data from the collected localization packets 130, the trained neural network 150 outputs one or more gesture classifications 160 depending on the output 133 from the FSR algorithm 131.

Referring now to FIG. 1D, which shows another aspect of a gesture classification operation, the framework includes a training network and a production network. The training network includes a data store 101 which provides a plurality of training localization packets 130' to a neural network 150' (e.g., an RNN). The plurality of training localization packets 130' includes UWB data, IMU data, and light intensity data from one or more finger sensors. The neural network 150' is trained using the plurality of training localization packets 130'. The training operation after the fully connected layer 120, in the provided example, is likewise configured to employ conventional operations, e.g., according to RNN, e.g., employing gradient descent and various normalization operations, and thus are not further described herein. Other training operations may also be employed. The production network of FIG. 1D includes a trained neural network 150 configured to receive a plurality of collected localization packets 130. The plurality of collected localization packets 130 include UWB data, IMU data, and light intensity data from one or more finger sensors. When the trained neural network 150 receives the UWB data, IMU data, and light intensity data from the collected localization packets 130, the trained neural network 150 outputs one or more gesture classifications 160.

Figure 1E:
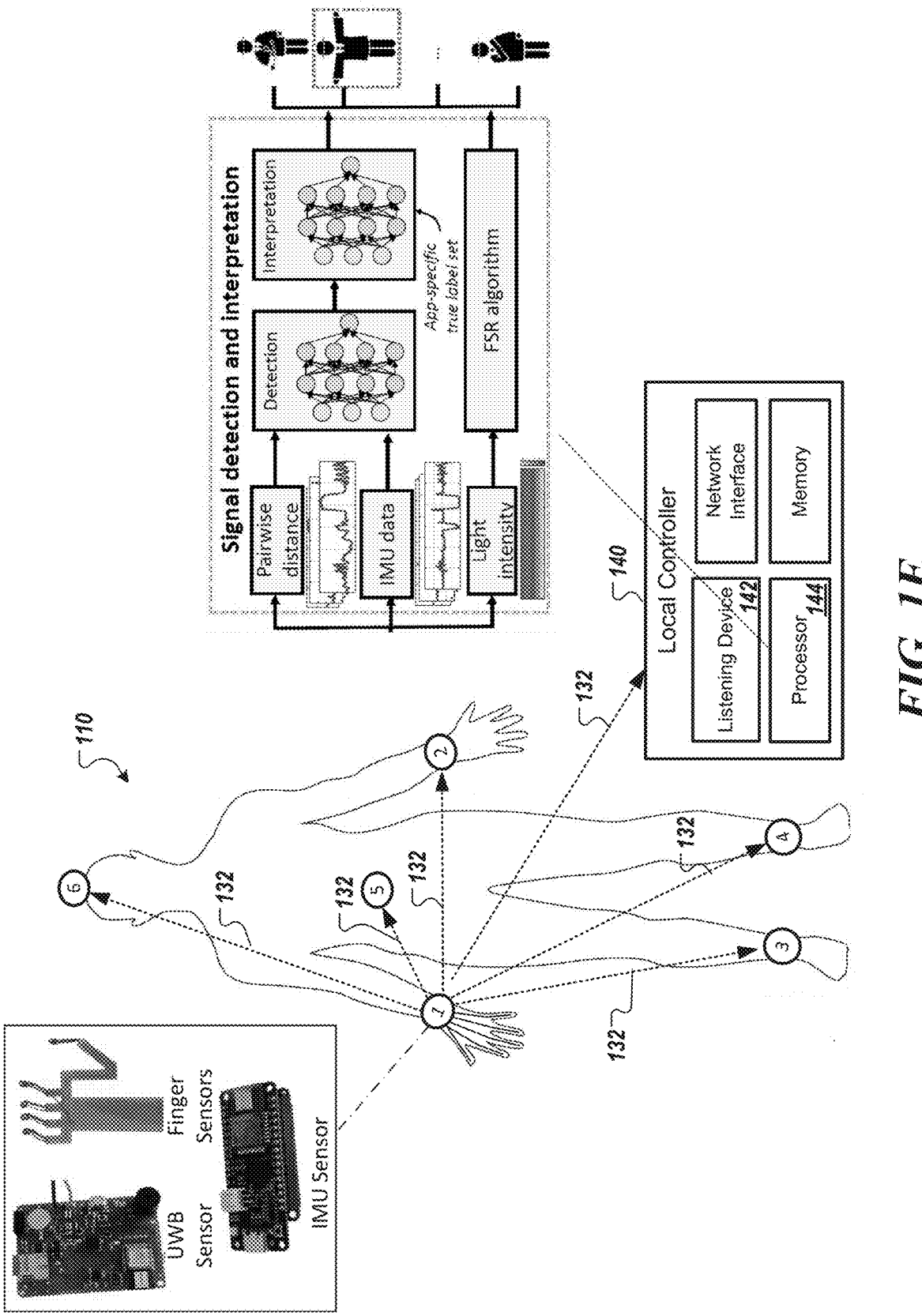
FIGS. 1E, 1F each show an example system architecture for signal detection and processing.
Figure 1F:
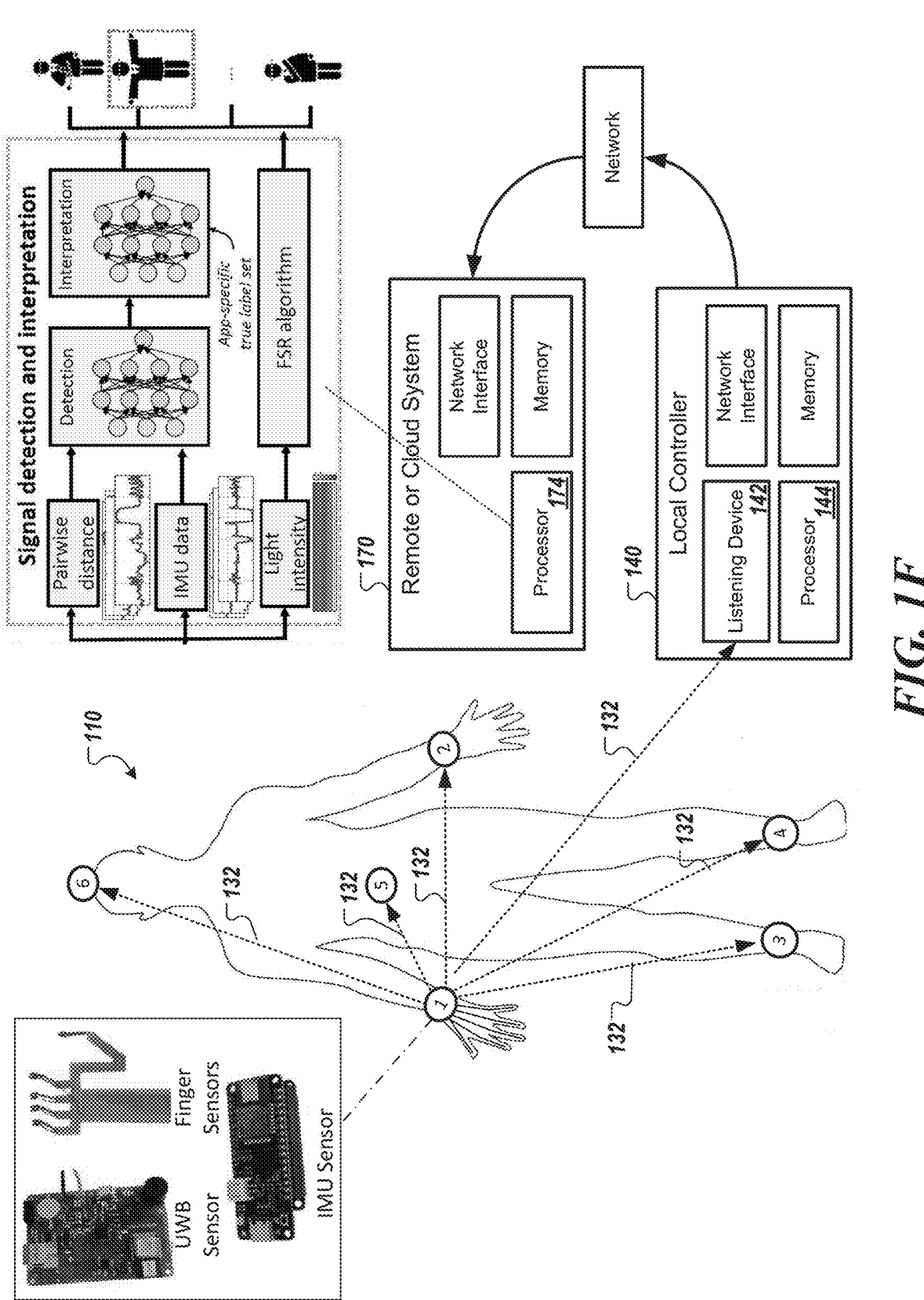
Figures 3A, 3B:
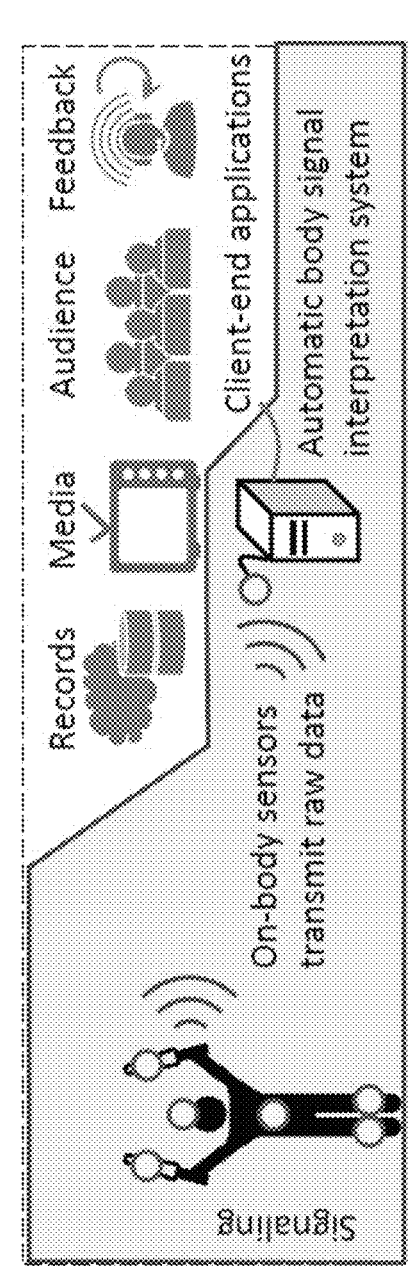
FIG. 3A shows an overview of the Exemplary System.
FIG. 3B shows various body signals used in sports and the construction industry.

FIGS. 1E-1F each show an example system architecture for signal detection and post signal processing. Referring specifically to FIG. 1E, the plurality of UWB communicating devices 110 are configured to be communicatively arranged as a plurality of nodes in a mesh configuration (e.g., all-to-all network). When a first localization packet of data 132 is received by the listening device 142 of the local controller 140, the local controller 140 by way of the processor 144 is configured to execute the trained machine learning classifier model using the collected localization packets and output the gesture classification of the user.

In another embodiment, shown in FIG. 1F, the the local controller 140 is configured to transmit the collected localization packets including the pair-wise distances to an external device 170. The external device 170 is then configured to execute the trained machine learning classifier model using a processor 174 to determine the gesture classification.
Example Method and Computer Readable Medium FIG. 2 shows a method 200 for classifying body gestures of a user. In an illustrative example, the method 200 includes receiving 202, on a local controller placed in proximity to a plurality of ultrawide-band (UWB) communicating devices (e.g., in a work area or as a wearable device), packets of data from each of the plurality of UWB communication devices arranged as a plurality of nodes in a mesh configuration (e.g., all-to-all network). The plurality of UWB communicating devices can include a first UWB communicating device that sequentially transmits in each of a plurality of messaging cycles, a first localization packet of data to each of the other plurality of UWB communicating devices, including a second UWB communicating device. The first UWB communicating device and the second UWB communicating device determine time associated values corresponding to receipts of the transmitted localization packets (e.g., time of flight (ToF)) sent from the other UWB communicating devices. The determined time associated value is included in the first localization packet. In the method 200 shown in FIG. 2, the first UWB communicating device and second UWB communicating device are positioned at a plurality of spaced apart locations on a user, including at a first body location and a second body location.

In some embodiments, the plurality of UWB communicating devices further include at least one IMU sensor communicatively coupled to at least one of the plurality of UWB communicating devices, wherein the communicatively coupled UWB communicating device transmit IMU data of the IMU sensor in the localization packet.

Method 200 further includes determining 204 pair-wise distances between each respective pair formed of the plurality of UWB communicating devices using the passively collected localization packets.

Method 200 also includes determining 206 a gesture classification of the user using the collected localization packets using a trained machine learning classifier model. In some embodiments, the trained machine learning classifier model includes a recurrent neural network (RNN).

In some embodiments, the body gestures of the user are associated with sport-related gestures, wherein training data set for the trained machine learning classifier model includes sport-associated call signals. In some other embodiments, the body gestures of the user are associated with warehouse or signaling-associated gestures (e.g., aircraft signaling), wherein training data set for the trained machine learning classifier model includes warehouse or signaling-associated body gestures.

In another aspect, a computer readable medium is disclosed having instructions stored thereon for the classification of body gestures of a user, wherein the instructions, when executed by a processor, cause the processor to perform any of the methods described herein. For example, a computer readable medium is disclosed having instructions stored thereon for the classification of body gestures of a user, wherein the instructions, when executed by a processor, cause the processor to: receive, on a local controller placed in proximity to a plurality of ultrawide-band (UWB) communicating devices (e.g., in a work area or as a wearable device), packets of data from each of the plurality of UWB communication devices arranged as a plurality of nodes in a mesh configuration (e.g., all-to-all network), wherein the plurality of UWB communicating devices includes a first UWB communicating device configured to sequentially transmit in each of a plurality of messaging cycles, a first localization packet of data to each of the other plurality of UWB communicating devices, including a second UWB communicating device, wherein the first UWB communicating device and the second UWB communicating device are configured to determine time associated values corresponding to receipts of the transmitted localization packets (e.g., time of flight (ToF)) sent from the other UWB communicating devices, wherein the determined time associated value is included in the first localization packet, wherein the first UWB communicating device and second UWB communicating device are configured to be positioned at a plurality of spaced apart locations on a user, including at a first body location and a second body location; and determine pair-wise distances between each respective pairs formed of the plurality of UWB communicating devices using the collected localization packets, wherein the collected localization packets including the pair-wise distances are used in a trained machine learning classifier model to determine a gesture classification of the user.

In some aspects, the plurality of UWB communicating devices further include at least one IMU sensor configured to be communicatively coupled to at least one of the plurality of UWB communicating devices, wherein the instructions executed by the processor further cause the communicatively coupled UWB communicating device to transmit IMU data of the IMU sensor in the localization packet.

In some aspects, the trained machine learning classifier model includes a recurrent neural network (RNN). In some aspects, the instructions when executed further cause the local controller to execute the trained machine learning classifier model (e.g., a recurrent neural network (RNN)) using the collected localization packets and output the gesture classification of the user.

In some embodiments, the instructions when executed further cause the local controller to transmit the collected localization packets including the pair-wise distances to an external device (e.g., cloud, smart phone tethered to the local controller), wherein the external device is configured to execute the trained machine learning classifier model to determine the gesture classification.

Experimental Results and Examples

In this experiment, a system (referred to herein as "Exemplary System") was created that can automatically interpret a user's actions using a lexicon of defined gestures. These interpreted actions can be stored in memory, or used to provide real-time feedback to the signaler, or make the signal interpretation available to the receiver of the signal, depending on the exact use-case. For example, in the case of aircraft marshalling interpreted actions can be stored for record-keeping and auditing purposes which can be particularly helpful during accident investigations. Immediate feedback to the signaler can be helpful in the construction industry to ensure correct signals are being given and to allow quick correction of errors. This automatic interpretation can further enable safer operations and avoid catastrophic accidents [1, 23, 45] caused due to signaling errors or misinterpretation. Finally, the system can also be implemented in other applications where gesture recognition is useful such as sporting events and virtual reality. For example, the system can transmit a gesture during a sporting event to provide automatic scoring.

The system uses a small number of on-body sensors that capture sufficient information to understand the position and the orientation of a few key body joints. These positions and orientations lead to identification of the body signals. Exemplary System is able to estimate the body pose through direct distance measurements between a few points on the body and fuse these with inertial orientation and light sensing. The distance measurements help localize the hands (2 body-joints at the wrists), feet (2 body-joints at the ankles), and the head (1 end-point on top of the head), with respect to the torso (1 body-joint on the waist) representing an approximate frame of the body through a total of 6-points. 5 of the points capture the extremities of the human body with 1 central reference. Through pair-wise ranging, the system can obtain 15 non-symmetric pair-wise distance measurements providing sufficient information to localize all the points with respect to the central reference in 3D.

Figure 4:
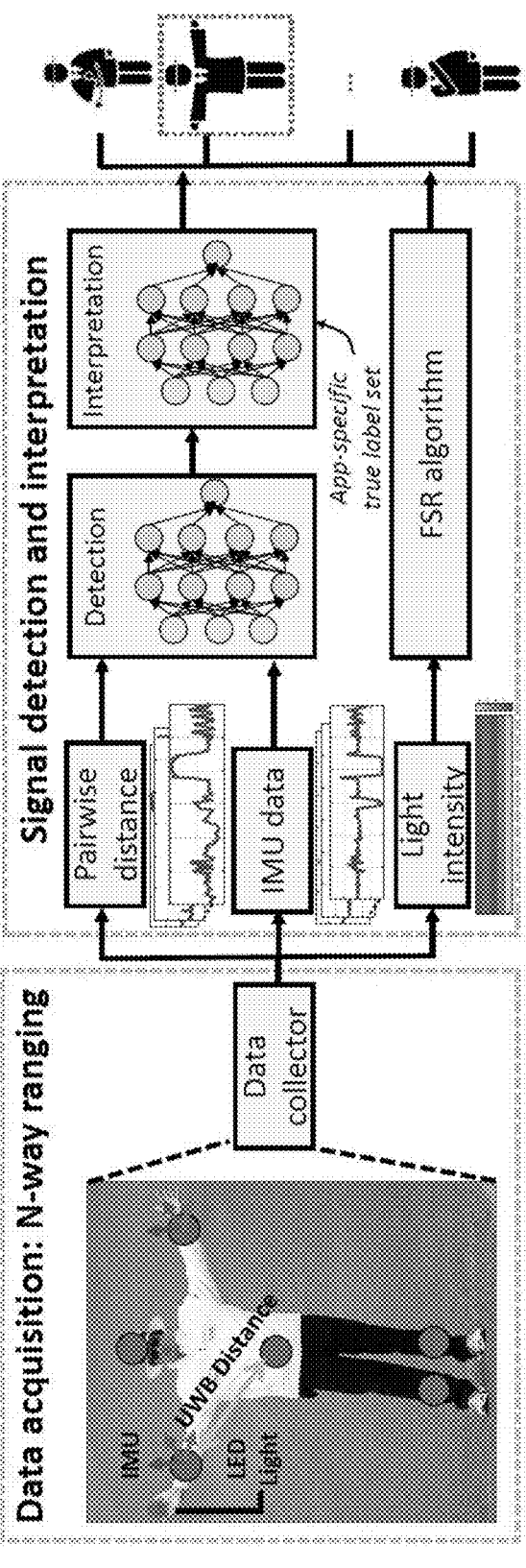
FIG. 4 shows an overview of the Exemplary System.

All distances are measured using UWB-based wireless ranging. The study thus obtained a distance matrix measuring the inter-node distances. The choice of UWB allows Exemplary System to accurately calculate the inter-node distance at decimeter-level precision [53], owing to the large bandwidth signals employed by UWB radios. Since the inter-node distances and per-joint positions are highly correlated, the distance matrix serves as a descriptive feature to understand the per-joint position. The introduction of the distance matrix makes Exemplary System inherently different from existing solutions, which rely solely on IMUs for determining human pose. Compared to IMU-only solutions, Exemplary System addresses the ambiguity introduced when the same orientation occurs at different positions, and is robust to the error caused by magnetic field variations. While Exemplary System offloads the position inference from IMUs to UWB, IMU is still useful in determining the orientation of the joint. Hence Exemplary System includes one IMU on each wrist. Note that IMUs and UWBs on the wrist are co-located hence no additional space is required for mounting IMUs. When using IMU, Exemplary System did not use the magnetometer for computing wrist orientation since the magnetometer can be corrupted by nearby ferromagnetic materials, particularly in the transportation and construction domains, due to prevalence of large metal objects, motors, and electromagnets. Finally, neither UWB nor IMU were used to estimate finger positions, which are important in certain applications, such as differentiating between "Bye" and "Out" in cricket umpire signals. To interpret finger signals, Exemplary System includes mounted photodiodes on fingers which capture varying FIG. 4 shows data acquisition and processing pipeline of the Exemplary System. At a high level, the design of the Exemplary System can be split into data acquisition phase and signal interpretation phase. In the data acquisition phase, the Exemplary System fuses the raw data of different modalities and transmits it to the processing computer in real-time. However, streaming data in real-time is nontrivial because the standard TWR used by UWB incurs significant delay. While the individual UWB packet rate can be as high as 300 Hz, delay increases quadratically as the number of nodes increased. To tackle this issue, Exemplary System adopts N-way ranging [28] to re-use the timings of previously received packets for ranging. Such a protocol is particularly applicable for Exemplary System since the number of UWB devices performing all-to-all ranging is fixed and these devices are all nearby. In the body-signal interpretation phase, the distance matrix and the IMU data are first fed into a body signal detection module. This module functions as an on/off switch or a filter which judges if there is a meaningful body signal in the current data stream. If this module returns "True", the distance matrix and the IMU data can be further fed into a model having LSTM layers and fully-connected layers for primary signal interpretation. As the fingers cannot be sensed by the UWB or the IMU, there remains ambiguity in the finger-related signals. To remove this ambiguity, Exemplary System adopts a finger signal recognition (FSR) algorithm to distinguish the signals with the same body pose but different finger states. Finally, the signal interpretation phase generates a vector of probabilities that the given data corresponds to a certain signal and returns the signal with the highest probability as the output.

Fast Data Collection: N-way Ranging. Real-world signal interpretation applications have a strict real-time demands. The Exemplary System combines together the distance from UWB transceivers, IMU data and light intensity from photodiodes as data streams, in which UWB communication is the bottleneck for time efficiency.

The standard TWR involves 3 messages to perform ranging between one device pair. Exemplary System uses the computation of the 3D locations of 6 on-body UWB devices. Performing all-to-all distance measurements creates 15 independent equations allowing the location of all devices in 3D space with respect to a central node on the waist. Standard TWR would require a total of 3n(n−1) messages to obtain a fully-filled distance matrix for n nodes. For a 6-node UWB transceiver system, the average time to obtain this distance matrix with standard TWR is ≈316 ms (3 Hz); too slow to extract motion features of some dynamic body signals.

To increase the update rate, a ranging protocol that will reduce the number of messages exchanged to perform all-to-all ranging would be advantageous. While this is a difficult problem in general (due to wireless reachability, collisions, etc.), in this case, where the number and IDs of nodes are fixed, and nodes are close to each other on the user's body, time division multiplexing (TDM) can be exploited to allow UWBs to take turns in transmitting the data. Given the feasibility of TDM, the study adopted NWTT to significantly reduce the ranging time. NWTT makes two improvements: (1) Instead of specifying a certain receiver ID, each UWB node broadcasts its message to all other nodes in its turn. (2) When transmitting the message, NWTT does not explicitly specify the message type (Poll, Resp, Final). The reception and sending time of every message will be recorded and communicated in the ranging system.

FIG. 1B shows a typical timing diagram of NWTT. Exemplary System uses Msg(SrcId, Seq) to identify a message in the system. Node 1 broadcasts a message Msg(1, 1) to all the nodes. When the other nodes receive Msg(1, 1), the next node 2 will take its turn to broadcast a message Msg(2, 1). Note that Msg(2, 1) can serve as both a reply to the received Msg(1, 1) to node 1 (like a Resp), and also a new Poll message to other nodes. When all the nodes send out a message, one round is complete at which time each pair should complete Poll-Resp round of ranging. Then node 1 starts a new messaging cycle by sending a new message Msg(1, 2). Similar to the previous round, Msg(1, 2) serves as both the Final message to previously received Msg(2, 1), Msg(3, 1), . . . and a new Poll message. By now, node 1 has completed the full two way ranging with all the other nodes. For example, Msg(1, 1), Msg(2, 1) and Msg(1, 2) completes the two way ranging between node 1 and 2.

The time complexity of ranging with NWTT is O(n) as it takes only n messages to perform all-all ranging on average, far more efficient than naively performing TWR between every device-pair, which has O(n²) time complexity. By applying the N-way time transfer method, the theoretical update rate increases from 3 Hz to 45 Hz. This enables collecting sufficient data to accurately classify body signals in real-time. In these experiments, the data rate was set to 16 Hz to balance real-time performance, power consumption, and compensate for the longer UWB packets when carrying IMU data.

Body Signal Detection. In many application domains, additional mechanisms such as whistle blowing in football, or a button press is already used for demarcating a body signal. Those remain applicable in Exemplary System as well, however, automatic body signal detection can be determined using the sensors described above.

The distance matrix, IMU data, and light intensity collected by each sensor were streamed to a processor continuously as time-series data. As the raw data are collected continuously, the data stream may contain many irrelevant non-signal actions; thus, determining the existence of a valid body signal and extracting it from the data stream improves model efficacy. However, such signal detection is challenging as the space of irrelevant actions is unbounded. It is extremely difficult to include every possible non-signal action in the dataset to make the model robust. Simple binary classification with a learner can lead to high false positive rate. One set of solutions to address infinite space of unknown non-signal actions is novelty detection techniques, such as one-class SVM [66] and support vector data description (SVDD) [63, 72]. They employ a hyperplane or a hypersphere to make the space of positive class as compact as possible. One issue in employing these techniques is that they train on only positive classes. However, in some body signal applications, signals can have variance. Therefore, using one class to train the model in body signals produces significant false negatives. For instance, to signal "out" in cricket, the umpire needs to raise an arm and stretch out one finger, but there is no strict rule about how high the hand should be raised. An unsupervised novelty detection model can mis-classify such variations.

To address this issue, Exemplary System employed a supervised neural network to train a binary classifier to perform signal detection. The study utilized SVDD to use a hypersphere to separate different classes. The time-series distance matrix and IMU data were first fed into an encoder which learned useful feature representations of the raw physical data. This encoder tried to separate signals and non-signals based on their distances to the origin: signals are closer to the origin while non-signals are farther. To avoid high false positive rate in unseen non-signal actions, Exemplary System created a soft boundary buffer between body signals and non-signal actions in the encoded feature space (as shown in FIG. 5). The purpose of this soft boundary buffer is to leave space for unseen non-signal actions or body signal variations. The model was trained to keep all the body signal samples inside the inner boundary and all the non-signal samples outside the outer boundary. Specifically, for input time-series data x in the input space X and its label y indicating whether this is a signal, let $\phi$ $(x;w,y):X{\rightarrow}F$ be a temporal neural network which encodes the raw data to some output feature space. The objective of Exemplary System's signal detection is:

$$\min_w \sum_{i=1}^n \left(\max\{\phi^2(x; w, y = 1) - R_I^2), 0\}\right) + \tag{1}$$

$$\left(\max\{R_O^2 - \phi^2(x; w, y = 0)), 0\}\right)$$

where $R_I$, $R_O$ (satisfying $R_I{<}R_O$) are the inner radius and outer radius of the soft boundary buffer. Once the model is trained, signals will mostly aggregate inside the inner boundary while non-signal actions will be distributed outside the outer boundary. Exemplary System used an application-specific threshold p to judge whether a time-window sample incorporates a valid signal.

Example Machine Learning Classification

Body Signal Classification. After ensuring the existence of a body signal in the current data stream, Exemplary System segmented it into fixed-length sliding time windows, and fed these data streams into a classification model. In an application-oriented view, the interpretation of body signals is frequently a two-part process: (i) determining the position and the orientation of main body joints and (ii) tracking finger pose to resolve the ambiguity if two signals are only different in finger configuration. Thus, on-finger light intensity can be separated from other inputs.

Avoiding Distance Errors Due to Body Blocking. The typical short-distance ranging precision of UWB in a line-of-sight (LOS) scenario is about 10 cm [36]. For the application domain, in theory, as most body signal sets ensure sufficient inter-class pose difference, 10 cm error in the distance should suffice for the classification task. However, in practice, the human body can cause strong radio-shielding [54], effectively blocking the direct signal path between a pair of UWB s. When blocking occurs, the measured distance is actually the in-air distance of first multipath, which is larger than the ground-truth direct distance. For instance, in the "short run" cricket signal (see FIG. 6), the distance between left wrist and right wrist is occasionally blocked by the torso. This leads to an overestimation of the distance since UWB receivers detect a later path and treat it as the first path.

Two observations can help perform these corrections: (1) any real change in distance can only result from physical movement which should be corroborated by the IMU sensors; (2) the measured distance can never be lower than the direct path, since this is the fastest that wireless signals can travel. These observations lead to a detect-and-then-correct approach. The experiment observe that one feature indicating signal blocking was intermittent distance overestimation as shown in FIG. 6, which results from the near-threshold direct path power and slight joint motion when performing a ranging measurement. To avoid confusing these intermittent distance overestimations with a dynamic signal which inherently has distance variance (e.g., "deadball" in cricket umpire signal), Exemplary System first checked the acceleration in the IMU data to classify the body signal as static or dynamic. Then the Exemplary System calculated the distance variance, var($d_{ij}$), between UWB nodes i, and j, in a fixed time window for static body signals. If var($d_{ij}$) was larger than a threshold, the Exemplary System flattened the top 50% samples to the mean distance in this time window, based on the key observation (2) above that direct path-length is always smaller than any multi-path.

Signal Interpretation Model. UWB distances and IMU data were then fed into a signal interpretation model. Only the streaming data that were classified as containing a body signal by the signal detection module, was considered for classification. As mentioned before, one of the benefits of fusing distance and IMU features is that joint features expose more details to understand the skeletal pose than using either of the modalities alone. Therefore, compared to other work [14, 29, 51], the Exemplary System uses a much more simplified architecture to extract features. Specifically, the Exemplary System employs a neural network composed by a Long Short-term Memory (LSTM) layer followed by two fully-connected layers. The hidden dimension size of the LSTM layer was set to 128. This LSTM layer is used to extract temporal features. The outputs of the LSTM layer were then fed into two fully-connected layers to be encoded into feature space. A softmax layer was concatenated at the end to output a k-dimension vector which gives the probability that the given input describes a certain body signal (k signals in all). The mean-square-error (MSE) of the predicted class was used as the loss function.

Finger Signal Recognition. Apart from the body signals identifiable through the 6 utilized body-points, many body signals also use different finger signals to further differentiate signals. For instance, a baseball umpire will use the fingers to count the number of balls and strikes pitched for the current batter. In the crane signal, one will open and close the four fingers to additionally indicate "lower/raise the load." However, finger configuration is not covered by either the UWB or IMU modalities. Recent advances in wearable finger tracking includes embedding IMU, flex or EMG sensors [6, 8, 10, 43] to sense the motion of the fingers. While existing solutions can track fine-grained finger motion, they generally rely on complicated models for training and regression on large amounts of observed data, or need expensive on-finger sensors to detect the state of the fingers. To simplify the process of finger signal recognition, the experiment used simplified mechanics to differentiate between "stretched" and "closed" states of each finger. For example, finger sign "two" is usually represented by stretching out index finger and middle finger. Based on this observation, the study mounted 5 tiny photodiodes at the root of each finger. Due to its miniaturized size, the photodiodes can be either mounted on gloves or embedded on accessory rings without affecting the user experience. Without wishing to be bound by theory, the principle behind using photodiodes is quite intuitive: when a finger is stretched out, the photodiode will receive more ambient light than when a finger is closed. By establishing a threshold on light intensity, the system can determine whether a finger is closed or not. Of course, different lighting conditions can cause any fixed threshold to fail. Therefore, an additional photodiode was also attached on the head which was used as the reference ambient light level ($I_{ref}$). As the head area is less likely to be blocked, the on-head photodiode can reliably track current ambient light.

FIG. 7 shows the light intensity of each photodiode ($I_{fin}$) when performing "zero", "two" and "five" with finger signs. Evidently, photodiodes receive little light when the first is closed for signalling zero. For "two" and "five", the system can observe an increase in the light intensity of corresponding stretched fingers.

With the on-finger and on-head photodiodes, Exemplary System performed finger signal recognition as follows: Exemplary System firstly incorporates the label output from the above described process. If multiple body signals correspond to this label, Exemplary System can calculate relative light intensity $I_{fin}/I_{ref}$ for each finger to form a quintuple. Then Exemplary System discretizes each finger's state into a binary array $L=\{0, 1\}^5_{i=1}$ with empirically-set threshold and determines the final output based on the minimum hamming distance from known finger configurations. Note that here the threshold varies under different ambient light. The study empirically calculated the optimal threshold setting under different light intensity. For the tested signal sets, binary finger state was sufficient to distinguish different visual signals. Of course, signal sets heavily dependent on finger poses (e.g., ALS sign language [92]) may require more sophisticated models for classification.

Figure 8:
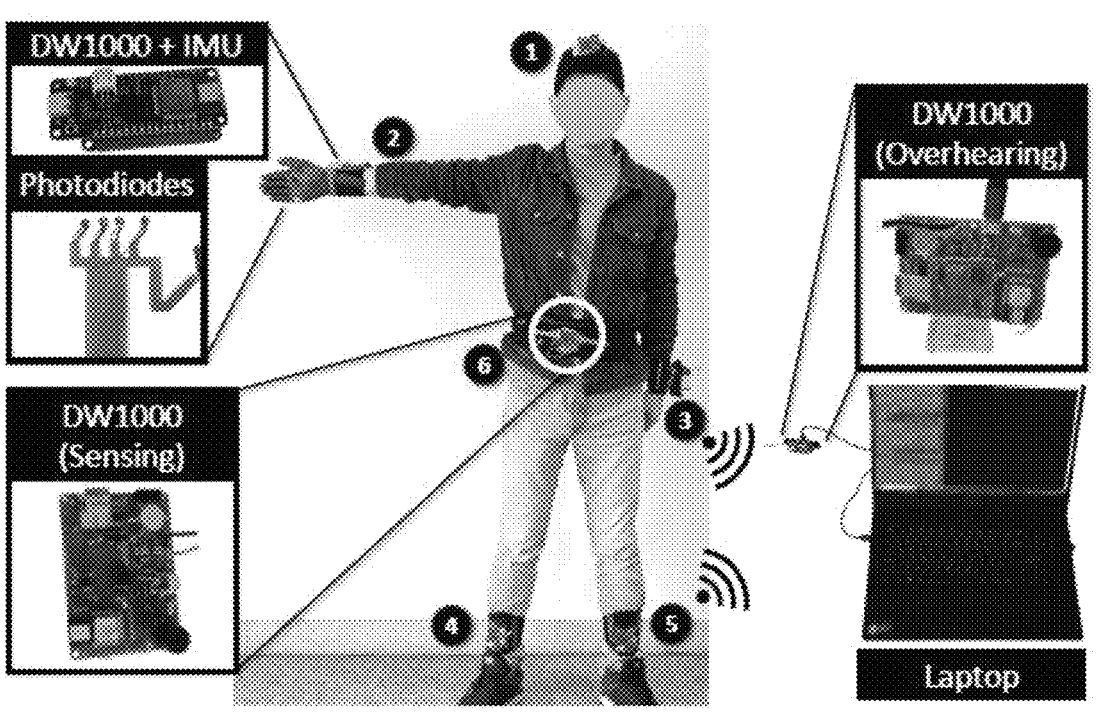
FIG. 8 shows an example framework of the Exemplary System.

The system used 6 UWB DWM1000 nodes [4], each connected to a Cortex MO microcontroller. These 6 nodes were mounted on the waist, left wrist, right wrist, left ankle, right ankle, and the head, as shown in FIG. 8. The two nodes on the wrist also hosted an ISM330DHCX 6-DOF inertial sensor accelerometer+gyroscope). The study calibrated the distances for UWB device by minimizing the Euclidean Distance Matrix error [5]. For IMUs, the gyroscope readings were calibrated by removing the zero bias when the sensor was static. Additionally, 5 photodiodes were mounted on a pair of gloves to detect stretched or closed state of the fingers. The photodiodes were connected to the on-wrist sensor through a custom manufactured flexible PCB specifically designed for this work.

UWB nodes, IMU, and photodiodes simultaneously collected and streamed data to the microcontroller. Because IMU and photodiodes stream much faster than UWB, the experiment first performed resampling to align the data rate for each modality. UWB nodes have the slowest data rate due to the overhead in performing NWTT. The data transmission rate was set to 110 Kbps, and center frequency to 4 GHz. Under this setting, the time to transmit a packet was approximately 3 ms. In the practical implementation, a guard time interval of 7 ms could be inserted to ensure transmission reliability and allow for processing delays. Hence, it took 6×(3+7)=60 ms to perform a full all-all ranging with the NWTT protocol, resulting in a practical data collection rate of 16 Hz. For IMU, the sampling rate was set to 80 Hz. The experiment embed 5 consecutive IMU entries in a single UWB packet so that the data rate could be matched. For the photodiodes, only one entry was embedded in a UWB packet for each photodiode. All the data were collected by the MO microcontroller and communicated through UWB to each other. These packets were also overheard by a nearby UWB listening device which did not participate in the all-to-all ranging, but just passively collected data. This listening device was connected to a laptop to stream received data and feed through the Exemplary System pipeline. This way, all on-body sensors sent their information to a single overhearing UWB device in the vicinity; UWB was both a communication vehicle as well as a sensing signal performing the ranging operation. While this eavesdropper was placed at about 2 m from the user in this implementation, it can also be placed on body in which case it can forward received packets to an edge device over wireless links with longer range. The overall setup is pictured in FIG. 8.

Evaluation. As described below, the study evaluated Exemplary System on 5 popular body signal applications: Cricket umpire signal Baseball umpire signal, Crane signal, Flag semaphore, and American football official signal.

Figure 9:
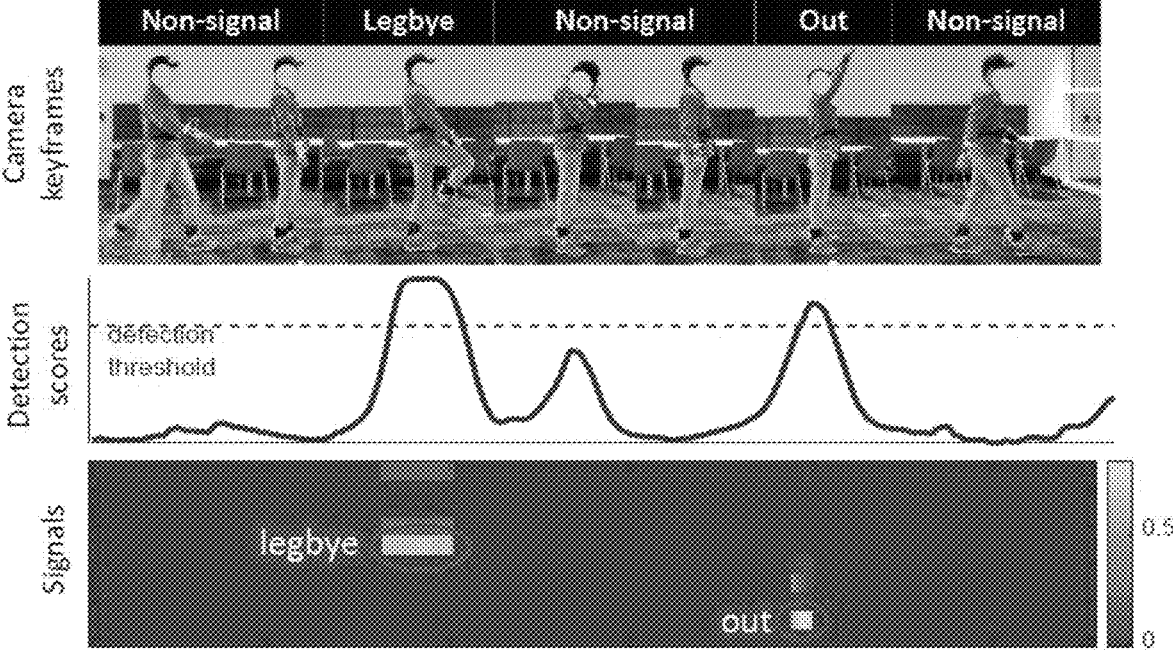
FIG. 9 shows an example processing pipeline in action on a real-world like umpire movements scenario.
Figures 10, 11:
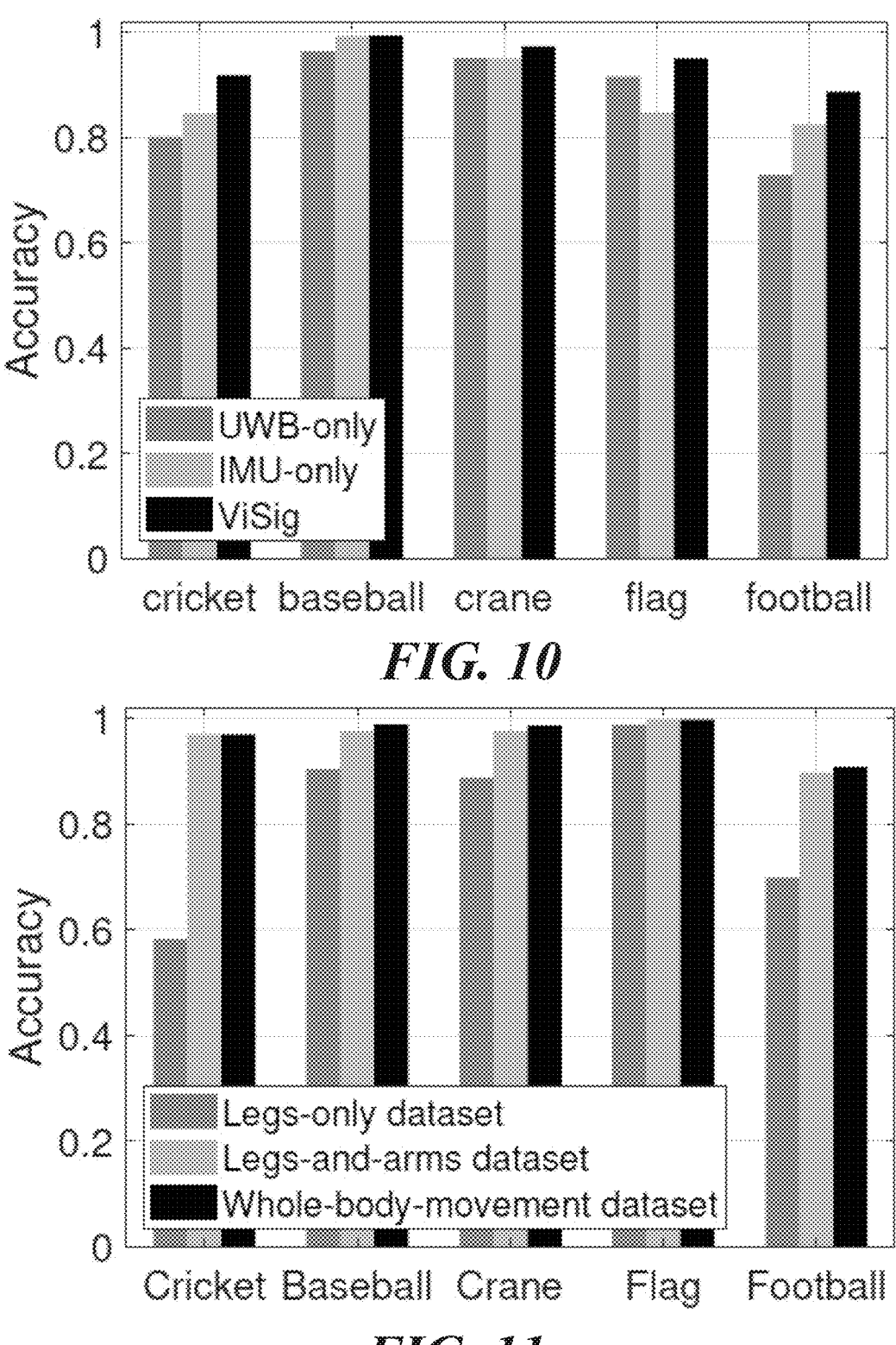
FIG. 10 shows Exemplary System outperforms UWB-only and IMU only features in signal detection.
FIG. 11 shows signal detection accuracy increases with data augmentation.

Exemplary System Pipeline Overview: Signal Detection and Classification. A volunteer was asked to wear the device and perform actions as if he/she is a cricket umpire. This included two body signals (leg-bye and out), interspersed with other random non-signal actions. In this test, Exemplary System first used the signal detector to determine whether a signal exists in the current time window. Once a potential signal was detected, the data was fed into the classifier for interpretation. FIG. 9 shows a layered view of the Exemplary System's activities. On the top layer, camera key-frames was observed by a camera are shown for easy interpretation. In the middle layer of FIG. 9, the likelihood that the current time-window contains a body signal was plotted as determined by the signal detector module. On the bottom layer of FIG. 9, at time windows where the detection threshold was exceeded, the Exemplary System classifier module produced a probability of the actual body signal detected. Both the "leg-bye" and "out" signals were correctly identified in this example. Of course, some non-signal action such as touching the hat also increases the detection score, but it stayed below the detection threshold, demonstrating the value of tuning the $R_0$ and $R_1$ boundaries per application.

Exemplary System Pipeline Internals: Body Signal Detection Accuracy. Next, the experiment evaluated Exemplary System's performance on signal detection in each application, i.e., the ability to correctly identify a signal or a non-signal action. In this experiment, volunteers were asked to wear Exemplary System devices and perform arbitrary signals or non-signal actions. As mentioned before, the key challenge of non-action signals was the unbounded nature and unpredictability of the non-action signal set. Since it is infeasible to train on all possible non-signals, the study designed two kinds of tests: (i) Test on well-defined (WD) non-signal actions. In this evaluation, non-signal actions in both training/test datasets included a few pre-defined common actions such as walking, scratching, natural hand motion, etc. (ii) Test on undefined (UD) non-signal actions. In this evaluation, non-signal actions in the training set included the pre-defined common actions in WD above. However, non-signal actions in the testing set were not covered in the training set (bending, arm waving, arbitrary poses, etc.). This test evaluated the generality of the Exemplary System's signal detection when samples in the test dataset follows a different distribution from the training dataset.

In both datasets, the samples of non-signals and signals were balanced to avoid training bias. Exemplary System trained the model following the steps above and identified a signal or a non-signal action by feeding the input data into Accuracy. The accuracy of softmax classifier was computed, deep-SVDD and Exemplary System on the two different datasets (WD and UD) via 3-fold cross-validation. The results of signal detection are shown in Table. 1. In the WD-dataset, since non-action signals were well defined, softmax classifier and the Exemplary System both achieved high accuracy. In contrast, the accuracy of deep-SVDD was low as it is a model trained with only positive samples, which generates many false negatives. In the UD-dataset, Exemplary System achieved an overall improvement over other two approaches. Such improvement comes from the soft buffer boundary between signals and non-signal actions in the training dataset. The model can identify input data as signal or non-signal via by customizing the threshold p with application-specific knowledge. For example, body signals in flag semaphore were expected to be more precise compared to signals in football, hence Exemplary System used a small p in flag semaphore and a large p in football. The false positives and false negatives are overall balanced under the specified detection thresholds. The study observed that mis-classified samples mainly occur at signals/non-signals which have an ambiguous boundary. For instance, in the cricket umpire signals, many mis-classified labels happen between "legbye (signal)" and "walking naturally". In the football official signals, "blocking below waist (signal)" is sometimes confused with "bending (non-signal)."

TABLE 1

| Signal detection accuracy in non-signal-well-defined datasets and non-signal-undefined datasets. | | | | | | |
|---|---|---|---|---|---|---|
| Signal Set | Softmax classifier (WD) | Deep-SVDD (WD) | Exemplary System (WD) | Softmax classifier (UD) | Deep-SVDD (UD) | Exemplary System (UD) |
| Cricket umpire signal | 99.0% | 80.0% | 98.5% | 79.7% | 85.7% | 91.9% |
| Baseball umpire signal | 99.3% | 84.9% | 99.7% | 99.1% | 88.9% | 99.3% |
| Crane signal | 98.1% | 77.2% | 98.7% | 96.7% | 90.9% | 97.3% |
| Flag semaphore | 97.7% | 89.3% | 98.7% | 85.4% | 75.0% | 95.1% |
| Football official signal | 90.6% | 76.0% | 87.2% | 88% | 88.2% | 88.7% | this model. In the experiment, Exemplary System employs an LSTM with 128 hidden units followed by a dense layer with 2 units. The experiment set $R_I=1$ and $R_O=2$ (see FIG. 5). The thresholds were set to 0.8 for cricket umpire signals, and flag semaphore, 1.3 for baseball umpire signals and crane signals, and 2.2 for football official signals, allowing the least body signal deviation of body signals from the training set in cricket and flag semaphore, while allowing for highest deviation in football.

The study implemented two baselines for comparison with Exemplary System: softmax classifier and deep SVDD [63]: (i) Softmax classifier: The softmax classifier employs an LSTM followed by fully-connected layers to propagate the input data. The output layer was a softmax classification layer which outputs a number between [0, 1] representing the probability of being a body signal. (ii) Deep SVDD. Deep SVDD takes only positive samples (i.e., signals) in the training process. It encoded the data with a deep network and then performs minimum volume estimation in the encoded space by finding a data-enclosing hypersphere of smallest size. In the evaluation, a sample is identified as a body signal if and only if it is inside the hypersphere. In an implementation, an LSTM was employed followed by fully-connected layers as the encoding layer.

Figure 12:
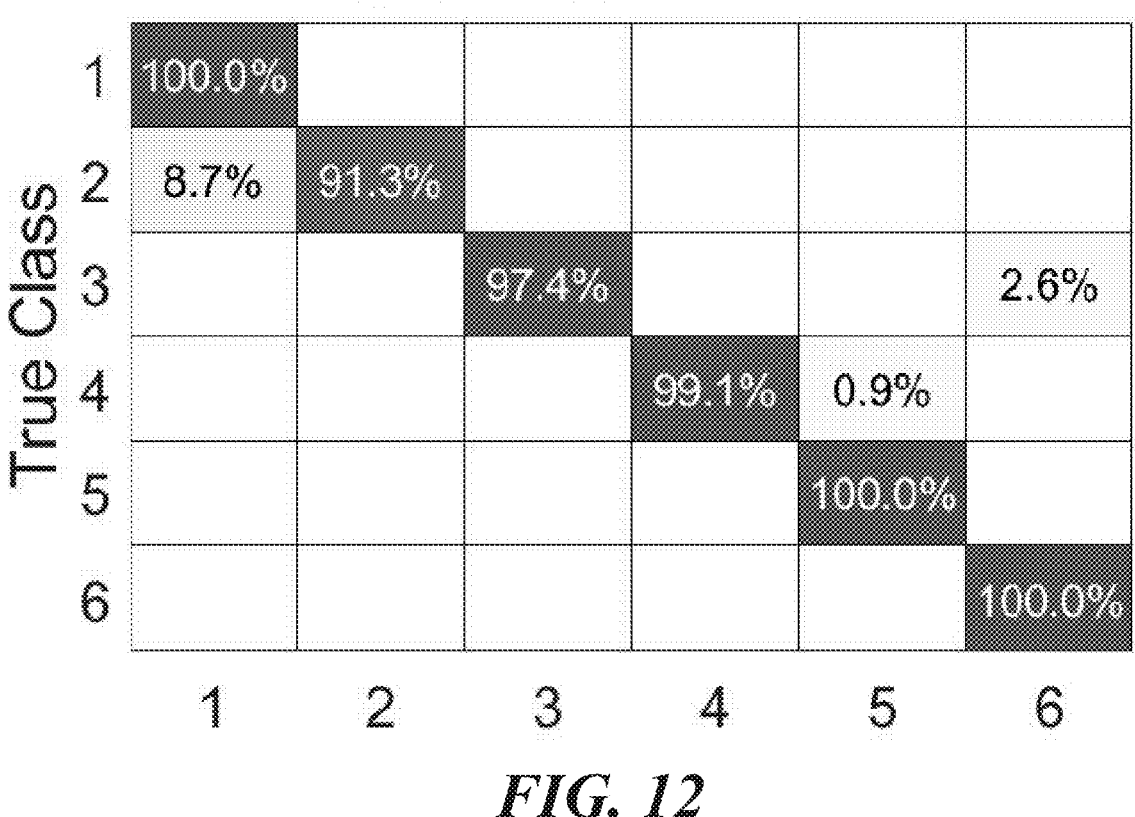
FIG. 12 shows a confusion matrix for crane operator signaling. Only error confusion is plotted for each application. 1. Extend Boom (one hand); 2. Hoist; 3. Raise Boom; 4. Stop; 5. Travel; 6. Use Main Hoist.

Ablation Study. The experiment also performed an ablation study on the UD dataset to understand the importance of fusing UWB and IMU features. The same network architecture was employed for each case, only varying the input dimension to fit with the raw data dimension after removing UWB/IMU features. FIG. 12 shows that Exemplary System outperforms UWB-only and IMU-only approaches in all applications. This demonstrates that UWB-IMU fusion is capable of solving ambiguity that exists in the single-modality signal detection.

Figure 13:
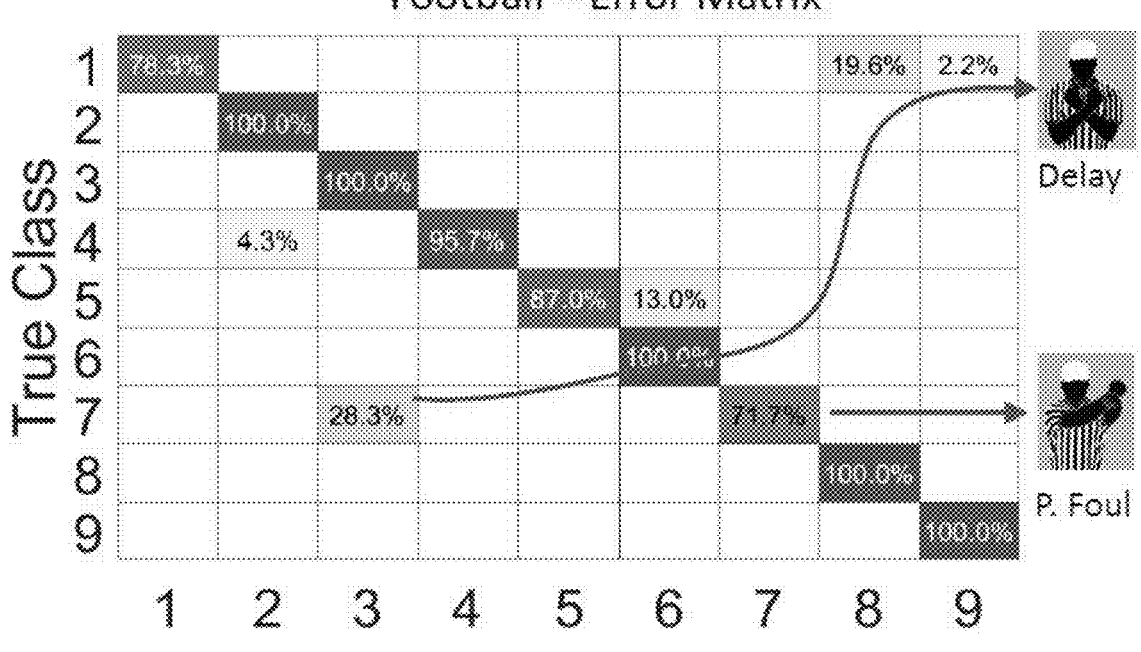
FIG. 13 shows a confusion matrix for football signaling. Only error confusion is plotted for each application. 1. Ball Ready; 2.; 3. Delay; 4. Illegal Pass; 5. Illegal Shift; 6. Incomplete; 7. Personal Foul; 8. Roughing Passer; 9. Start Clock.

Effect of Expanding Dataset. Of course, current non-signal dataset is a subset of the whole non-signal space. To understand the effect of an expanding dataset, an experiment was designed where progressively more types of actions from the well-defined set were used from training the model. Specifically, three training datasets were prepared with increasing diversity in the non-signal actions: Legs-only dataset: Only incorporates standing still and walking as non-signals. Legs-and-arms dataset: Additionally incorporates natural actions such as touching face/head, crossing hand, etc. Whole-body-movement dataset: Additionally incorporates strenuous actions like running, jumping, etc. The above three datasets were used and tested on the UD dataset which includes hand-waving, bending, etc. Results are shown in FIG. 13. The results observed a prominent improvement in detection accuracy from the legs-only dataset to the legs-and-arms dataset whereas the improvement from the legs-and-arms to the whole-body-movement dataset was marginal. This demonstrated that with more diverse non-signal samples, the model could be trained to learn the true distribution of signals and non-signals which contributes to the performance improvement. However, seeing more and more non-signal body actions provided diminishing returns. When the dataset is sufficiently large, significant new data collection effort is needed to achieve higher accuracy.

System Pipeline Internals: Body Signal Classification Accuracy. The evaluation of the Exemplary System's classification capabilities was divided into two stages: single-user evaluation, and cross-user evaluation. Note that the application domain of body signals typically used a specific designated person to perform the duties of a signaler, who is also trained specifically for the job. Therefore, the Exemplary System's on-body sensor apparatus can be thought of as "owned" by a particular person. The model's training of activity recognition applications, a model trained with multiple users and evaluated on a different set of users is more desirable. Therefore, Exemplary System was also evaluated across different volunteers to test the generality of the approach. In the first stage (single-user evaluation), one of the researchers collected data for all the 5 applications by wearing the sensors. For each application, the researcher performed all the signals multiple times over different days/scenarios. The purpose of evaluation in this stage was to present the performance of the Exemplary System functioning as a user-specific system in signal interpretation. In the second stage (cross-user evaluation), 11 volunteers were recruited: 3 for data collection and model evaluation. The heights of volunteers range from 1.65 m to 1.83 m to assess the generality of the model.

In both stages, participant(s) wore 6 on-body sensors and performed every application-specific body signal. Then the experiment segmented the streaming samples into multiple 2 s–time windows. The study arbitrarily extracted k (20≤k≤30) time window samples per person per signal, adjusting for starting and ending times of the signal. In the single-user evaluation, more than 10 sets of signals (each application varies) were collected from the same volunteer in each application. In the cross-user evaluation, one full set of signals was collected from each volunteer in baseball, crane, flag semaphore, football, and two full sets of signals from each volunteer in cricket. The samples in every time window will be the raw data fed into the system for training a model. The distance matrix obtained by UWB and acceleration obtained by IMU was fused to train the model, and then FSR was performed with on-finger photodiodes. Data was collected at different locations including (i) outdoor open area; (ii) laboratory environment; (iii) indoor atrium; (iv) apartment; and (v) in a corridor, and at different times of the day. The experiment set a hard range on distances for data sanitation. Only data with distances in [0, 3 m] were used. Overall over 30 hours of body signal data was collected for this evaluation. To avoid model bias, the experiment manually balanced the number of samples for all volunteers in cross-user evaluation. The details of datasets are described in Table. 2.

TABLE 2

Datasets in single-user (SU) and cross-user (CU) evaluation.

| | Signal # | Finger signals | SU-test user # | CU-test user # | SU-test sample | CU-test sample |
|---|---|---|---|---|---|---|
| Cricket umpire signal [69] | 11 | Yes | 1 | 9 | 5520 | 4158 |
| Baseball umpire signal [7] | 13 | Yes | 1 | 11 | 4485 | 3276 |
| Crane signal [65] | 20 | Yes | 1 | 11 | 8602 | 5040 |
| Flag semaphore [81] | 30 | No | 1 | 11 | 8280 | 7560 |
| Football official signal [9] | 47 | Yes | 1 | 3 | 6072 | 3243 |

For the evaluation, in the first stage, the classification accuracy of n-fold cross-dataset validation was average, where n was the number of datasets collected at different days/locations. In the second stage, the experiment performed n-fold cross-user validation, where data of n−1 volunteers formed the training set and test the model on the last volunteer, for all n volunteers.

Single User Performance with Ablation Study. In this experiment, the basic classification accuracy of the Exemplary System was evaluated on five different applications. Each specific body signal was a class in classification. Mathematically, for every class i∈ all classes C, (|C|=c), the accuracy was computed from the proportion of correctly predicted labels to all predicted labels (P, T are the predicted and true label):

$$\frac{\sum_{i}^{c} \text{Number}(P == i, \ T == i)}{\text{Number}_{all}} \qquad (2)$$

Figure 14:
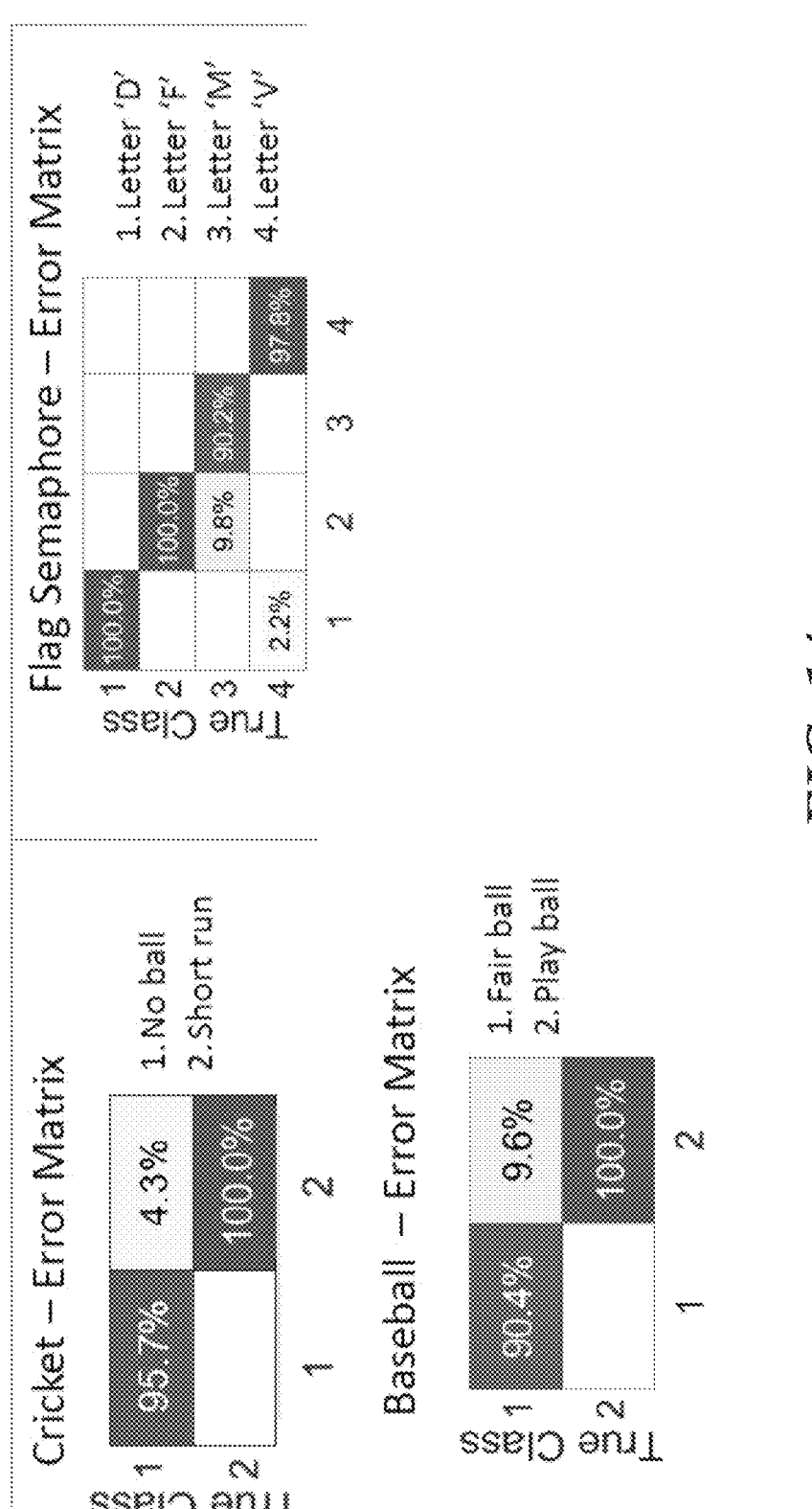
FIG. 14 shows confusion matrices for three different applications. Only error confusion is plotted for each application.

Since Exemplary System used a UWB-IMU sensor fusion approach, the experiment tested the value of this fusion by comparing against a UWB-only and an IMU-only system. As shown in Table. 3, in the single-user test, Exemplary System achieved above 95% accuracy in four of five applications, and 94.7% accuracy in football which contains 47 different signals. Of course, certain body signals are more susceptible to being confused with other signals. FIGS. 12-14 shows some example confusion matrices for different applications in the test. The experiment observed that there are three leading causes of mis-classification: (1) proximity of different signals in the feature space, (2) intra-class data variance, and (3) raw data precision limits. For example, "Delay" and "Personal Foul" in football differ only in how far the crossing arms are from the chest (proximity in feature space). Such difference is blurred further after taking intra-class variance (for the same signal, put the hand at slightly different places but still recognizable), and inherent UWB distance measurement precision (±10 cm).

TABLE 3

Exemplary System classification accuracy on different applications in the single-user test.

| | IMU-only | UWB-only | Exemplary System |
|---|---|---|---|
| Cricket | 93.9% | 91.4% | 98.5% |
| Baseball | 92.4% | 85.8% | 98.0% |
| Crane | 97.4% | 82.9% | 98.7% |

TABLE 3-continued

| Exemplary System classification accuracy on different applications in the single-user test. | | | |
| --- | --- | --- | --- |
| | IMU-only | UWB-only | Exemplary System |
| Flag semaphore | 89.6% | 64.2% | 95.7% |
| Football | 93.9% | 78.9% | 94.7% |

Table. 3 also gives the result of ablation study in the single-user scenario. For cricket, baseball, and flag semaphore signals. Exemplary System outperformed UWB-only models by 7.1%, 12.2%, 31.5%, and outperformed IMU-only models by 4.6%, 5.6%, 6.1% in the given signal examples. For crane signal and football signals, the improvements of the Exemplary System over IMU-only solutions were marginal, at 1.3% and 0.8% respectively. One of the reasons for the marginal improvement in these two applications is that crane signals and football signals involved many dynamic action where IMU can infer the signal from the motion pattern itself, without necessarily requiring UWB at all. The fusion allowed Exemplary System to achieve 95% accuracy in all cases, which would not be feasible using any one technology alone. The gains come from inherently different properties of the two sensors; even if one modality incurs errors or cannot resolve ambiguity, the other one can still extract key features from raw data to perform signal interpretation.

Cross User Performance with Ablation Study. In the single user study, the accuracy was computed when the classification model was trained on that particular user's data. the Exemplary System's cross-user performance was evaluated as specified in the experimental setup. An n-fold cross-user validation was applied to acquire average accuracy numbers.

The results are shown in Table. 4. In the cross-user scenario, the experiment observed a slight decrease in the accuracy compared to the single-user scenario, which could caused by variance when different volunteers are performing signals. Overall, the Exemplary System still achieved an over 90% accuracy in all applications. As for the ablation study, Exemplary System outperformed IMU-only models by 9.6%, 9.2%, 5.5%, 11.4%, 6% for each application, and outperformed UWB-only models by 6.7%, 13.4%, 16.8%, 27.7%, 29.2%. A non-trivial increase was observed in the improvement of the Exemplary System over IMU-only models in the cross-user scenario. This indicates that in the cross-user scenario, there is a significant increase in IMU variance when performing the same signal, while fusing with UWB measurements provides the required robustness, further validating the reasoning of using both IMU and UWB modalities.

TABLE 4

| Exemplary System classification accuracy on different applications in the cross-user test. | | | |
| --- | --- | --- | --- |
| | IMU-only | UWB-only | Exemplary System |
| Cricket | 88.0% | 90.9% | 97.6% |
| Baseball | 87.9% | 83.7% | 97.1% |
| Crane | 92.2% | 80.9% | 97.7% |
| Flag semaphore | 80.8% | 64.5% | 92.2% |
| Football | 84.7% | 61.5% | 90.7% |

Finger Signal Recognition Accuracy. As finger signs are frequently used in body signals to indicate counts, the study also conducted an experiment focusing on finger signal recognition accuracy. FIG. 15 shows 8 common finger signs used in this experiment. Data was collected in both indoor and outdoor environments. The reference ambient light intensities ($I_{fin}/I_{ref}$) in the two environments was 400 lux and 18000 lux. Whether the finger is stretched or closed was determined by a threshold set to 0.2 in the indoor environment and 0.7 in the outdoor environment. FIG. 15 presents the FSR accuracy, showing that Exemplary System achieves higher than 99% accuracy for all signs, demonstrating the effectiveness of Exemplary System in FSR. The cause of 1% error is that sometimes light can leak to the photodiode on a closed finger. For example, when indicating "OK", light can leak to the photodiode on thumb and index finger at certain hand posture positions, leading to confusion with "four" or "five".

As discussed above, a reference photodiode was placed on the head to allow for an estimation of the ambient light, $I_{ref}$ at any given time. The light intensity measured by the photodiodes on the hand is typically a fraction of the current reference intensity $I_{ref}$; a larger fraction when the finger is stretched, and a smaller fraction when the finger is closed. However, in different lighting conditions, the amount of light that leaks between fingers is different.

To understand intensity variations better, the study collected data at 6 positions with different light conditions (100, 400, 650, 1600, 4500, 18000 lux respectively). Among them, positions with light intensity from 100 to 650 were indoor locations under artificial light. The positions with 1600 and 4500 lux light intensity were indoor positions illuminated with sunshine (through glass panels). The position with 18000-lux intensity was an outdoor location. FIG. 16 shows the relative light intensity range of stretched fingers and closed fingers, and the intervening threshold selection margin. The study observed that while a single threshold can be used for all indoor locations (≤4500 lux), a different threshold would be desired for outdoor environment (18000 lux). In the indoor environments, under both artificial or through-glass sunshine, a threshold between [0.1, 0.3] was desired. However, in outdoor environments, as light leaking between fingers can still be substantial, the threshold shifted to [0.48, 0.83] range. Thus, the threshold selection algorithm depended on the absolute measured light intensity level of the reference, selecting between an indoor-threshold or an outdoor-threshold. Note that sunshine intensity can vary significantly based on time of day, day of the year, and latitude. Therefore, a single threshold is unlikely to work; some fine-tuning will always be necessary, and the photodiode on the cap provides a good reference.

Learning Models. Since the fusion of IMU and UWB features informatively describes a body signal, Exemplary System employed a simple network architecture to train the model. Furthermore, a model with a simpler network also has the advantage of implementation simplicity and resource efficiency. Recently, a variety of new models have found application in the wearable human action recognition space. The study compared performance with two other promising approaches: LSTM ensembles [29]: LSTM ensembles trains multiple LSTM learners to output scores for each signal. These scores are then fed into a meta-classifier for signal interpretation. AttendDiscriminator [14]: Self-attention mechanism [77] relates different positions of a single sequence to compute a feature representation. In human action recognition, AttendDiscriminator employs a self-attention layer to encode cross-channel feature interactions which aids accurate recognition of activities.

The experiment implemented LSTM ensembles and AttendDiscriminator network and tested the performance on the cross-user datasets. For LSTM ensembles, the study trained 10 LSTM learners. FIG. 17 shows that the accuracy differences on all 5 applications are quite minor (±2%). In crane, flag, and football application, LSTM ensembles outperformed the current model by 1-2%, but it needs a much larger model (10× memory size) as well as longer time (10.5×) to converge in the training. Preferring resource efficiency, the Exemplary System chose a simple LSTM followed by fully-connected layers as the neural network architecture.

Effect of Different Environments. Exemplary System makes a conscious effort to reduce the impact of different environments on performance. The choice of UWB for distance measurements provided robustness due to its ability to separate out wireless multipath caused by nearby objects, and its wireless frequency range (3.5 GHz-4.5 GHz) did not interfere with existing WiFi devices. Furthermore, since the on-body sensors are proximal to each other, there is minimal influence from multipath. For validation, two sets of cricket umpire signal data were collected from the same user at a total of 5 locations: outdoor, indoor atrium, corridor, fully-furnished room, and a lab. The observed channel impulse response (CIR) for outdoor space and the fully-furnished room is shown in FIG. 19, to provide a visual guide contrasting two of the extreme environments in this experiment. Exemplary System was able to achieve 100% accuracy in all the tested environments, thus providing substantial confidence in the robustness of this approach.

Overhearing Ranging Test. In this implementation, the UWB eavesdropper (i.e., listening device) about 2 meters away from the user for data collection. However, an alternative is placing the eavesdropper on body, and then the eavesdropper can forward the received message to an edge device via a different wireless link (like Wi-Fi or LTE) with longer range. A UWB ranging test was performed to understand the effective UWB range between the eavesdropper and the user in a pure UWB system. The test was conducted in the outdoor environment. The packet reception ratio (PRR) was measured when the eavesdropper was placed at different distances from the user. Results are shown in FIG. 18. In the outdoor environment, PRR dropped from 91.8% to 31.9% when moving from 20 m to 25 m, indicating the effective available range in the outdoor environment was approximately 20 m. As a note, this range is not the maximum range of the Exemplary System. For instance, collecting data via Wi-Fi (2.4/5 GHz) can extend the range to 100 m [2].

Power Consumption. As signal interpretation was done externally on a laptop, the main power consumption of the Exemplary System occurred from the UWB ranging, IMU, and photodiode data collection. Each device had a power consumption of about 391 mW. On a small 3.7V/1200 mAh Lipo battery (4×3 cm2, 24 g), Exemplary System can work for 11.5 hours before requiring a recharge, satisfying the requirements of most applications.

Neural Networks. An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can be arranged in a plurality of layers such as input layer, output layer, and optionally one or more hidden layers. An ANN having hidden layers can be referred to as a deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tan H, or rectified linear unit (ReLU) function), and provide an output in accordance with the activation function. Additionally, each node is associated with a respective weight. ANNs are trained with a dataset to maximize or minimize an objective function. In some implementations, the objective function is a cost function, which is a measure of the ANN's performance (e.g., error such as L1 or L2 loss) during training, and the training algorithm tunes the node weights and/or bias to minimize the cost function. This disclosure contemplates that any algorithm that finds the maximum or minimum of the objective function can be used for training the ANN. Training algorithms for ANNs include but are not limited to backpropagation. It should be understood that an artificial neural network is provided only as an example machine learning model. This disclosure contemplates that the machine learning model can be any supervised learning model, semi-supervised learning model, or unsupervised learning model. Optionally, the machine learning model is a deep learning model. Machine learning models are known in the art and are therefore not described in further detail herein.

A convolutional neural network (CNN) is a type of deep neural network that has been applied, for example, to image analysis applications. Unlike traditional neural networks, each layer in a CNN has a plurality of nodes arranged in three dimensions (width, height, depth). CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by downsampling). A fully-connected layer includes neurons, where each neuron is connected to all of the neurons in the previous layer. The layers are stacked similar to traditional neural networks. GCNNs are CNNs that have been adapted to work on structured datasets such as graphs.

The term "recurrent neural network" (RNN) may denote a specific class of artificial neural networks in which connections between nodes may form a directed graph along a temporal sequence. This may allow it to exhibit a temporal dynamic behavior. Unlike feedforward neural networks, RNNs can use their internal state (memory) to process sequences of inputs. This can position RNNs advantageous for contact matrix data. One type of RNN is the Long Short-Term Memory (LSTM) network, which uses special gating mechanisms that help training RNNs more effectively. LSTMs can be implemented in various types of networks and the term LSTM is to be understood to cover any type of LSTM variants.

Other Supervised Learning Models. A logistic regression (LR) classifier is a supervised classification model that uses the logistic function to predict the probability of a target, which can be used for classification. LR classifiers are trained with a data set (also referred to herein as a "dataset")

to maximize or minimize an objective function, for example, a measure of the LR classifier's performance (e.g., error such as L1 or L2 loss), during training. This disclosure contemplates that any algorithm that finds the minimum of the cost function can be used. LR classifiers are known in the art and are therefore not described in further detail herein.

An Naïve Bayes' (NB) classifier is a supervised classification model that is based on Bayes' Theorem, which assumes independence among features (i.e., the presence of one feature in a class is unrelated to the presence of any other features). NB classifiers are trained with a data set by computing the conditional probability distribution of each feature given a label and applying Bayes' Theorem to compute the conditional probability distribution of a label given an observation. NB classifiers are known in the art and are therefore not described in further detail herein.

A k-NN classifier is a supervised classification model that classifies new data points based on similarity measures (e.g., distance functions). The k-NN classifiers are trained with a data set (also referred to herein as a "dataset") to maximize or minimize an objective function, for example, a measure of the k-NN classifier's performance, during training. This disclosure contemplates that any algorithm that finds the maximum or minimum of the objective function can be used. The k-NN classifiers are known in the art and are therefore not described in further detail herein.

A majority voting ensemble is a meta-classifier that combines a plurality of machine learning classifiers for classification via majority voting. In other words, the majority voting ensemble's final prediction (e.g., class label) is the one predicted most frequently by the member classification models. The majority voting ensembles are known in the art and are therefore not described in further detail herein.

Example Computing System. It should be appreciated that the logical operations described above and in the appendix can be implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts, and/or modules can be implemented in software, in firmware, in special purpose digital logic, in hardware, and any combination thereof. It should also be appreciated that more or fewer operations can be performed than shown in the figures and described herein. These operations can also be performed in a different order than those described herein.

The computer system is capable of executing the software components described herein for the exemplary method or systems. In an embodiment, the computing device may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device to provide the functionality of a number of servers that are not directly bound to the number of computers in the computing device. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or can be hired on an as-needed basis from a third-party provider. Some cloud computing environments may comprise cloud computing resources owned and operated by the enterprise as well as cloud computing resources hired and/or leased from a third-party provider.

In its most basic configuration, a computing device includes at least one processing unit and system memory. Depending on the exact configuration and type of computing device, system memory may be volatile (such as random-access memory (RAM)), non-volatile (such as read-only memory (ROM), flash memory, etc.), or some combination of the two.

The processing unit may be a standard programmable processor that performs arithmetic and logic operations necessary for the operation of the computing device. While only one processing unit is shown, multiple processors may be present. As used herein, processing unit and processor refers to a physical hardware device that executes encoded instructions for performing functions on inputs and creating outputs, including, for example, but not limited to, microprocessors (MCUs), microcontrollers, graphical processing units (GPUs), and application-specific circuits (ASICs). Thus, while instructions may be discussed as executed by a processor, the instructions may be executed simultaneously, serially, or otherwise executed by one or multiple processors. The computing device may also include a bus or other communication mechanism for communicating information among various components of the computing device.

Computing devices may have additional features/functionality. For example, the computing device may include additional storage such as removable storage and non-removable storage including, but not limited to, magnetic or optical disks or tapes. Computing devices may also contain network connection(s) that allow the device to communicate with other devices, such as over the communication pathways described herein. The network connection(s) may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing devices may also have input device(s) such as keyboards, keypads, switches, dials, mice, trackballs, touch screens, voice recognizers, card readers, paper tape readers, or other well-known input devices. Output device(s) such as printers, video monitors, liquid crystal displays (LCDs), touch screen displays, displays, speakers, etc., may also be included. The additional devices may be connected to the bus in order to facilitate the communication of data among the components of the computing device. All these devices are well known in the art and need not be discussed at length here.

The processing unit may be configured to execute program code encoded in tangible, computer-readable media. Tangible, computer-readable media refers to any media that is capable of providing data that causes the computing device (i.e., a machine) to operate in a particular fashion. Various computer-readable media may be utilized to provide instructions to the processing unit for execution. Example tangible, computer-readable media may include but is not limited to volatile media, non-volatile media, removable media, and non-removable media implemented in any method or technology for storage of information such as computer-readable instructions, data structures, program modules, or other data. System memory, removable storage, and non-removable storage are all examples of tangible computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EE-PROM), flash memory or other memory technology, CD-ROM, digital versatile disks (DVD) or other optical storage, magnetic cassettes, magnetic tape, magnetic disk storage or other magnetic storage devices.

In light of the above, it should be appreciated that many types of physical transformations take place in the computer architecture in order to store and execute the software components presented herein. It also should be appreciated that the computer architecture may include other types of computing devices, including hand-held computers, embedded computer systems, personal digital assistants, and other types of computing devices known to those skilled in the art.

In an example implementation, the processing unit may execute program code stored in the system memory. For example, the bus may carry data to the system memory, from which the processing unit receives and executes instructions. The data received by the system memory may optionally be stored on the removable storage or the non-removable storage before or after execution by the processing unit.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and it may be combined with hardware implementations.

It will be apparent to those skilled in the art that various modifications and variations can be made in the present disclosure without departing from the scope or spirit of the invention. Other embodiments of the disclosure will be apparent to those skilled in the art from consideration of the specification and practice of the methods disclosed herein. It is intended that the specification and examples be considered as exemplary only, with a true scope and spirit of the invention being indicated by the following claims.

It should be appreciated that the logical operations described above and, in the appendix, can be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts and/or modules can be implemented in software, in firmware, in special purpose digital logic, in hardware, and any combination thereof. It should also be appreciated that more or fewer operations can be performed than shown in the figures and described herein. These operations can also be performed in a different order than those described herein.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the reference list. For example, Ref. [1] refers to the Pt reference in the list. All references cited and discussed in this specification are incorporated herein by reference in their entireties and to the same extent as if each reference was individually incorporated by reference.

Moreover, the various components may be in communication via wireless and/or hardwire or other desirable and available communication means, systems and hardware. Moreover, various components and modules may be substituted with other modules or components that provide similar functions.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5).

Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications and publications as listed below and throughout this document are hereby incorporated by reference in their entirety herein.

[1] 2002. Taxiing Accident involving Arrow Air APWP6L. www.mot.gov.sg/docs/default-source/about-mot/investigation-report/28-feb-2002.pdf.

[2] 2013. IEEE Standard for Information technology-Telecommunications and information exchange between systemsLocal and metropolitan area networks-Specific requirements-Part 11: Wireless LAN Medium Access Control (MAC) and Physical Layer (PHY) Specifications-Amendment 4: Enhancements for Very High Throughput for Operation in Bands below 6 GHz. IEEE Std 802.11ac-2013 (Amendment to IEEE Std 802.11-2012, as amended by IEEE Std 802.11ae-2012, IEEE Std 802.11aa-2012, and IEEE Std 802.11ad-2012) (2013), 1-425.

[3] 2016. IEEE Standard for Low-Rate Wireless Networks. IEEE Std 802.15.4-2015 (Revision of IEEE Std 802.15.4-2011) (2016), 1-709. doi.org/10.1109/IEEESTD.2016.7460875

[4] 2017. Decawave User Manual. www.decawave.com/sites/default/files/resources/dw1000_user_manual_2.11.pdf.

[5] 2018. Antenna Delay Calibration of DW1000-based Products and Systems (APS014).www.qorvo.com/innovation/ultra-wideband/resources/application-notes.

[6] 2021. 5DT Data Glove Ultra-5DT. 5dt.com/5dt-data-glove-ultra/.

[7] 2021. Baseball umpire signal. www.nfhs.org/media/1017816/baseball_umpires_signals_2021-1.pdf.

[8] 2021. CyberGlove Systems LLC. www.cyberglovesystems.com/.

[9] 2021. Football official signal. www.nfhs.org/media/4016213/2021-nfhs-official-football-signals.pdf.

[10] 2021. Industry leading VR techology—Manus VR. www.manus-vr.com/.

[11] 2021. Labor Force Statistics from the Current Population Survey. www.bls.gov/cps/cpsaatl 1.htm.

[12] 2021. optiTrack. optitrack.com/.

[13] 2021. Vicon motion capture system. www.vicon.com/.

[14] Alireza Abedin, Mahsa Ehsanpour, Qinfeng Shi, Hamid Rezatofighi, and Damith C Ranasinghe. 2020. Attend And Discriminate: Beyond the State-of-the-Art for Human Activity Recognition using Wearable Sensors. arXiv preprint arXiv:2007.07172 (2020).

[15] Boyd Anderson, Mingqian Shi, Vincent Y F Tan, and Ye Wang. 2019. Mobile gait analysis using foot-mounted UWB sensors. Proceedings of the ACM on Interactive, Mobile, Wearable and Ubiquitous Technologies 3, 3 (2019), 1-22.

[16] Ling Bao and Stephen S Intille. 2004. Activity recognition from user-annotated acceleration data. In International conference on pervasive computing. Springer, 1-17.

[17] Sedney R Bedico, Edrhiza Mae L Lope, Erdwin John L Lope, Edward B Lunjas, Andrea Paola D Lustre, and Roselito E Tolentino. 2020. Gesture recognition of basketball referee violation signal by applying dynamic time warping algorithm using a wearable device. In 2020 Fourth International Conference on Computing Methodologies and Communication (ICCMC). IEEE, 249-254.

[18] Sambit Bhattacharya, Bogdan Czejdo, and Nicolas Perez. 2012. Gesture classification with machine learning using kinect sensor data. In 2012 Third International Conference on Emerging Applications of Information Technology. IEEE, 348-351.

[19] Hakan Bilen, Basura Fernando, Efstratios Gavves, Andrea Vedaldi, and Stephen Gould. 2016. Dynamic Image Networks for Action Recognition. In Proceedings of the IEEE Conference on Computer Vision and Pattern Recognition (CVPR).

[20] Andreas Bulling, Jamie A Ward, and Hans Gellersen. 2012. Multimodal recognition of reading activity in transit using body-worn sensors. ACM Transactions on Applied Perception (TAP) 9, 1 (2012), 1-21.

[21] Zhe Cao, Tomas Simon, Shih-En Wei, and Yaser Sheikh. 2017. Realtime multi-person 2d pose estimation using part affinity fields. In Proceedings of the IEEE conference on computer vision and pattern recognition. 7291-7299.

[22] Hubert Cecotti and Axel Graser. 2010. Convolutional neural networks for P300 detection with application to brain-computer interfaces. IEEE transactions on pattern analysis and machine intelligence 33, 3 (2010), 433-445.

[23] Americrane & Hoist Corporation. 2021. CRANE OPERATOR HAND SIGNALS AND THEIR IMPORTANCE. www.amchoist. com/news/crane-operator-hand-signals-and-their-importance-46177.

[24] Navneet Dalal and Bill Triggs. 2005. Histograms of oriented gradients for human detection. In 2005 IEEE computer society conference on computer vision and pattern recognition (CVPR'05), Vol. 1. Ieee, 886-893.

[25] Wilfrid Taylor Dempster. 1955. The anthropometry of body action. (1955).

[26] Christoph Feichtenhofer, Haoqi Fan, Jitendra Malik, and Kaiming He. 2019. SlowFast Networks for Video Recognition. In Proceedings of the IEEE/CVF International Conference on Computer Vision (ICCV).

[27] Christoph Feichtenhofer, Axel Pinz, and Andrew Zisserman. 2016. Convolutional two-stream network fusion for video action recognition. In Proceedings of the IEEE conference on computer vision and pattern recognition. 1933-1941.

[28] Marilynn P Green. 2005. N-way time transfer ('NWTT') method for cooperative ranging. Contribution 802.15-05-0499-00-004a to the IEEE 802.15. 4a Ranging Subcommittee (2005).

[29] Yu Guan and Thomas Plotz. 2017. Ensembles of deep lstm learners for activity recognition using wearables. Proceedings of the ACM on Interactive, Mobile, Wearable and Ubiquitous Technologies 1, 2 (2017), 1-28.

[30] R Hari and M Wilscy. 2014. Event detection in cricket videos using intensity projection profile of Umpire gestures. In 2014 Annual IEEE India Conference (INDICON). IEEE, 1-6.

[31] Jogi Hofmueller, Aaron Bachmann, and IOhannes zmoelnig. 2007. The Transmission of IP Datagrams over the Semaphore Flag Signaling System (SFSS). (2007). datatracker.ietf.org/doc/html/rfc4824.

[32] H M Sajjad Hossain, M D Abdullah Al Haiz Khan, and Nirmalya Roy. 2018. DeActive: scaling activity recognition with active deep learning. Proceedings of the ACM on Interactive, Mobile, Wearable and Ubiquitous Technologies 2, 2 (2018), 1-23.

[33] Yinghao Huang, Manuel Kaufmann, Emre Aksan, Michael J Black, Otmar Hilliges, and Gerard Pons-Moll. 2018. Deep inertial poser: Learning to reconstruct human pose from sparse inertial measurements in real time. ACM Transactions on Graphics (TOG) 37, 6 (2018), 1-15.

[34] IEEE802.15.4z. 2020. IEEE Standard for Low-Rate Wireless Networks-Amendment 1: Enhanced Ultra Wideband (UWB) Physical Layers (PHYs) and Associated Ranging Techniques. IEEE Std 802.15.4z-2020 (Amendment to IEEE Std 802.15.4-2020) (2020), 1-174. doi.org/10.1109/IEEESTD.2020.9179124

[35] Jeya Vikranth Jeyakumar, Liangzhen Lai, Naveen Suda, and Mani Srivastava. 2019. SenseHAR: a robust virtual activity sensor for smartphones and wearables. In Proceedings of the 17th Conference on Embedded Networked Sensor Systems. 15-28.

[36] Antonio Ramon Jimenez and Fernando Seco. 2016. Comparing Decawave and Bespoon UWB location systems: Indoor/outdoor performance analysis. In 2016 International Conference on Indoor Positioning and Indoor Navigation (IPIN). IEEE, 1-8.

[37] Alexander Klaser, Marcin Marszalek, and Cordelia Schmid. 2008. A spatio-temporal descriptor based on 3d-gradients. In BMVC 2008-19th British Machine Vision Conference. British Machine Vision Association, 275-1.

[38] Ming Hsiao Ko, Geoff West, Svetha Venkatesh, and Mohan Kumar. 2005. Online context recognition in multisensor systems using dynamic time warping. In 2005 International Conference on Intelligent Sensors, Sensor Networks and Information Processing. IEEE, 283-288.

[39] Jennifer R Kwapisz, Gary M Weiss, and Samuel A Moore. 2011. Activity recognition using cell phone accelerometers. ACM SigKDD Explorations Newsletter 12, 2 (2011), 74-82.

[40] Ivan Laptev, Marcin Marszalek, Cordelia Schmid, and Benjamin Rozenfeld. 2008. Learning realistic human actions from movies. In 2008 IEEE Conference on Computer Vision and Pattern Recognition. IEEE, 1-8.

[41] Oscar D Lara, Alfredo J Perez, Miguel A Labrador, and Jose D Posada. 2012. Centinela: A human activity recognition system based on acceleration and vital sign data. Pervasive and mobile computing 8, 5 (2012), 717-729.

[42] Selena Larson. 2017. Google Home now recognizes your individual voice. money.cnn.com/2017/04/20/technology/google-home-voice-recognition/index.html.

[43] Yilin Liu, Shijia Zhang, and Mahanth Gowda. 2021. NeuroPose: 3D Hand Pose Tracking using EMG Wearables. In Proceedings of the Web Conference 2021. 1471-1482.

[44] Ziyu Liu, Hongwen Zhang, Zhenghao Chen, Zhiyong Wang, and Wanli Ouyang. 2020. Disentangling and Unifying Graph Convolutions for Skeleton-Based Action Recognition. In Proceedings of the IEEE/CVF Conference on Computer Vision and Pattern Recognition (CVPR).

[45] Marine Construction Magazine. 2020. CRANE OPERATION AND ROUTINE SAFETY PROCEDURES. marineconstructionmagazine.com/safety/crane-operation-and-routine-safety-procedures/.

[46] Alan Mazankiewicz, Klemens Bohm, and Mario Berges. 2020. Incremental real-time personalization in human activity recognition using domain adaptive batch normalization. Proceedings of the ACM on Interactive, Mobile, Wearable and Ubiquitous Technologies 4, 4 (2020), 1-20.

[47] Michael McLaughlin and Billy Verso. 2016. Asymmetric Double-sided Two-way ranging in an UWB Communication System.

[48] Pierre Merriaux, Yohan Dupuis, Remi Boutteau, Pascal Vasseur, and Xavier Savatier. 2017. A study of vicon system positioning performance. Sensors 17, 7 (2017), 1591.

[49] Sina Mohseni, Mandar Pitale, J B S Yadawa, and Zhangyang Wang. 2020. Self-supervised learning for generalizable out-of-distribution detection. In Proceedings of the AAAI Conference on Artificial Intelligence, Vol. 34. 5216-5223.

[50] Vishvak S Murahari and Thomas Plotz. 2018. On attention models for human activity recognition. In Proceedings of the 2018 ACM international symposium on wearable computers. 100-103.

[51] Francisco Javier Ordóñez and Daniel Roggen. 2016. Deep convolutional and lstm recurrent neural networks for multimodal wearable activity recognition. Sensors 16, 1 (2016), 115.

[52] International Civil Aviation Organization. 2005. Rules of the Air—Annex 2. www.icao.int/Meetings/anconf12/Document % 20Archive/an02_cons %5B1%5D.pdf.

[53] Timothy Otim, Alfonso Bahillo, Luis Enrique Diez, Peio Lopez-Iturri, and Francisco Falcone. 2019. FDTD and empirical exploration of human body and UWB radiation interaction on TOF ranging. IEEE Antennas and Wireless Propagation Letters 18, 6 (2019), 1119-1123.

[54] Timothy Otim, Alfonso Bahillo, Luis Enrique Diez, Peio Lopez-Iturri, and Francisco Falcone. 2019. Impact of body wearable sensor positions on UWB ranging. IEEE Sensors Journal 19, 23 (2019), 11449-11457.

[55] Guansong Pang, Chunhua Shen, and Anton van den Hengel. 2019. Deep anomaly detection with deviation networks. In Proceedings of the 25th ACM SIGKDD international conference on knowledge discovery & data mining. 353-362.

[56] Sarah Perez. 2019. Alexa developers can now personalize their skills by recognizing the user's voice. techcrunch.com/2019/09/26/alexa-developers-can-now-personalize-their-skills-by-recognizing-the-users-voice/.

[57] A J Piergiovanni and Michael S Ryoo. 2018. Fine-grained activity recognition in baseball videos. In Proceedings of the ieee conference on computer vision and pattern recognition workshops. 1740-1748.

[58] Bahareh Pourbabaee, Mehrsan Javan Roshtkhari, and Khashayar Khorasani. 2018. Deep convolutional neural networks and learning ECG features for screening paroxysmal atrial fibrillation patients. IEEE Transactions on Systems, Man, and Cybernetics: Systems 48, 12 (2018), 2095-2104.

[59] Nikhil Raveendranathan, Stefano Galzarano, Vitali Loseu, Raffaele Gravina, Roberta Giannantonio, Marco Sgroi, Roozbeh Jafari, and Giancarlo Fortino. 2011. From modeling to implementation of virtual sensors in body sensor networks. IEEE Sensors Journal 12, 3 (2011), 583-593.

[60] Aravind Ravi, Harshwin Venugopal, Sruthy Paul, and Hamid R Tizhoosh. 2018. A dataset and preliminary results for umpire pose detection using SVM classification of deep features. In 2018 IEEE Symposium Series on Computational Intelligence (SSCI). IEEE, 1396-1402.

[61] Daniel Roetenberg, Henk Luinge, and Per Slycke. 2007. Moven: Full 6dof human motion tracking using miniature inertial sensors. Xsen Technologies, December 2, 3 (2007), 8.

[62] Daniel Roggen, Alberto Calatroni, Mirco Rossi, Thomas Holleczek, Kilian Förster, Gerhard Troster, Paul Lukowicz, David Bannach, Gerald Pirkl, Alois Ferscha, et al. 2010. Collecting complex activity datasets in highly rich networked sensor environments. In 2010 Seventh international conference on networked sensing systems (INSS). IEEE, 233-240.

[63] Lukas Ruff, Robert Vandermeulen, Nico Goernitz, Lucas Deecke, Shoaib Ahmed Siddiqui, Alexander Binder, Emmanuel Muller, and Marius Kloft. 2018. Deep one-class classification. In International conference on machine learning. 4393-4402.

[64] Lukas Ruff, Robert A Vandermeulen, Nico Gornitz, Alexander Binder, Emmanuel Muller, Klaus-Robert Muller, and Marius Kloft. 2019. Deep semi-supervised anomaly detection. arXiv preprint arXiv:1906.02694 (2019).

[65] Occupational Safety and Health Administration (OSHA). 2010. HAND SIGNALS FOR CRANE OPERATION. www.osha.gov/sites/default/files/laws-regs/federalregister/2010-08-09.pdf.

[66] Bernhard Schölkopf, John C Platt, John Shawe-Taylor, Alex J Smola, and Robert C Williamson. 2001. Estimating the support of a high-dimensional distribution. Neural computation (2001), 1443-1471.

[67] Paul Scovanner, Saad Ali, and Mubarak Shah. 2007. A 3-dimensional sift descriptor and its application to action recognition. In Proceedings of the 15th ACM international conference on Multimedia. 357-360.

[68] Karen Simonyan and Andrew Zisserman. 2014. Two-stream convolutional networks for action recognition in videos. arXiv preprint arXiv:1406.2199 (2014).

[69] BBC Sport. 2021. The umpire's signals. http://news.bbc.co.uk/sportacademy/hi/sa/cricket/rules/umpire_signals/newsid_3809000/3809867.stm.

[70] Jie Su, Zhenyu Wen, Tao Lin, and Yu Guan. 2022. Learning Disentangled Behaviour Patterns for Wearable-based Human Activity Recognition. Proceedings of the ACM on Interactive, Mobile, Wearable and Ubiquitous Technologies 6, 1 (2022), 1-19.

[71] Luke Sy, Nigel H Lovell, and Stephen J Redmond. 2020. Estimating lower limb kinematics using distance measurements with a reduced wearable inertial sensor count. In 2020 42nd Annual International Conference of the IEEE Engineering in Medicine & Biology Society (EMBC). IEEE, 4858-4862.

[72] David M J Tax and Robert μW Duin. 2004. Support vector data description. Machine learning 54, 1 (2004), 45-66.

[73] Yu Tian, Guansong Pang, Yuanhong Chen, Rajvinder Singh, Johan W. Verjans, and Gustavo Carneiro. 2021. Weakly-Supervised Video Anomaly Detection With Robust Temporal Feature Magnitude Learning. In Proceedings of the IEEE/CVF International Conference on Computer Vision (ICCV). 4975-4986.

[74] Roberto Luis Shinmoto Torres, Qinfeng Shi, Anton van den Hengel, and Damith C Ranasinghe. 2017. A hierarchical model for recognizing alarming states in a batteryless sensor alarm intervention for preventing falls in older people. Pervasive and Mobile Computing 40 (2017), 1-16.

[75] Du Tran, Lubomir Bourdev, Rob Fergus, Lorenzo Torresani, and Manohar Paluri. 2015. Learning Spatiotemporal Features With 3D Convolutional Networks. In Proceedings of the IEEE International Conference on Computer Vision (ICCV).

[76] Linlin Tu, Xiaomin Ouyang, Jiayu Zhou, Yuze He, and Guoliang Xing. 2021. FedDL: Federated Learning via Dynamic Layer Sharing for Human Activity Recognition. In Proceedings of the 19th ACM Conference on Embedded Networked Sensor Systems. 15-28.

[77] Ashish Vaswani, Noam Shazeer, Niki Parmar, Jakob Uszkoreit, Llion Jones, Aidan N Gomez, Lukasz Kaiser, and Illia Polosukhin. 2017. Attention is all you need. Advances in neural information processing systems 30 (2017).

[78] Timo Von Marcard, Bodo Rosenhahn, Michael J Black, and Gerard Pons-Moll. 2017. Sparse inertial poser: Automatic 3d human pose estimation from sparse imus. In Computer Graphics Forum, Vol. 36. Wiley Online Library, 349-360.

[79] Jindong Wang, Yiqiang Chen, Shuji Hao, Xiaohui Peng, and Lisha Hu. 2019. Deep learning for sensor-based activity recognition: A survey. Pattern Recognition Letters 119 (2019), 3-11.

[80] Xin Wang and Zhenhua Zhu. 2021. Vision-based hand signal recognition in construction: A feasibility study. Automation in Construction 125 (2021), 103625.

[81] Wikipedia. 2021. Flag semaphore. en.wikipedia.org/wiki/Flag semaphore.

[82] Wikipedia. 2021. List of International Cricket Council members. en.wikipedia.org/wiki/List_of_International_Cricket_Council_members.

[83] Wikipedia. 2021. Underway replenishment. en.wikipedia.org/wiki/Underway_replenishment.

[84] Sijie Yan, Yuanjun Xiong, and Dahua Lin. 2018. Spatial temporal graph convolutional networks for skeleton-based action recognition. In Thirty-second AAAI conference on artificial intelligence.

[85] Jianbo Yang, Minh Nhut Nguyen, Phyo Phyo San, Xiao Li Li, and Shonali Krishnaswamy. 2015. Deep convolutional neural networks on multichannel time series for human activity recognition. In Twenty-fourth international joint conference on artificial intelligence.

[86] Piero Zappi, Clemens Lombriser, Thomas Stiefmeier, Elisabetta Farella, Daniel Roggen, Luca Benini, and Gerhard Troster. 2008. Activity recognition from on-body sensors: accuracy-power trade-off by dynamic sensor selection. In European Conference on Wireless Sensor Networks. Springer, 17-33.

[87] Julius Žemgulys, Vidas Raudonis, Rytis Maskeliu¯nas, and Robertas Damaševičius. 2018. Recognition of basketball referee signals from videos using Histogram of Oriented Gradients (HOG) and Support Vector Machine (SVM). Procedia computer science 130 (2018), 953-960.

[88] Julius Žemgulys, Vidas Raudonis, Rytis Maskeliu¯nas, and Robertas Damaševičius. 2020. Recognition of basketball referee signals from real-time videos. Journal of Ambient Intelligence and Humanized Computing 11, 3 (2020), 979-991.

[89] Ming Zeng, Le T Nguyen, Bo Yu, Ole J Mengshoel, Jiang Zhu, Pang Wu, and Joy Zhang. 2014. Convolutional neural networks for human activity recognition using mobile sensors. In 6th international conference on mobile computing, applications and services. IEEE, 197-205.

[90] Mi Zhang and Alexander A Sawchuk. 2013. Human daily activity recognition with sparse representation using wearable sensors. IEEE journal of Biomedical and Health Informatics 17, 3 (2013), 553-560.

[91] Yi Zheng, Qi Liu, Enhong Chen, Yong Ge, and J Leon Zhao. 2014. Time series classification using multi-channels deep convolutional neural networks. In International conference on web-age information management. Springer, 298-310.

[92] Hao Zhou, Taiting Lu, Yilin Liu, Shijia Zhang, and Mahanth Gowda. 2022. Learning on the Rings: Self-Supervised 3D Finger Motion Tracking Using Wearable Sensors. Proceedings of the ACM on Interactive, Mobile, Wearable and Ubiquitous Technologies 6, 2 (2022), 1-31.

What is claimed:

1. A system comprising:

a plurality of ultrawide-band (UWB) communicating devices configured to be communicatively arranged as a plurality of nodes in a mesh configuration, wherein the plurality of UWB communicating devices includes a first UWB communicating device configured to sequentially transmit in each of a plurality of messaging cycles, a first localization packet of data to each of the other plurality of UWB communicating devices, including a second UWB communicating device, wherein the first UWB communicating device and the second UWB communicating device are configured to determine time associated values corresponding to receipts of the transmitted localization packets sent from the other UWB communicating devices, wherein the determined time associated value is included in the first localization packet, wherein the first UWB communicating device and second UWB communicating device are configured to be positioned at a plurality of spaced apart locations on a user, including at a first body location and a second body location; and a local controller placed in proximity to the plurality of UWB communicating devices, the local controller as a listening device is configured to (i) passively collect the localization packets sequentially transmitted by the respective UWB communicating devices and (ii) determine pair-wise distances between each respective pairs formed of the plurality of UWB communicating devices using the passively collected localization packets, wherein the collected localization packets including the pair-wise distances are used in a trained machine learning classifier model to determine a gesture classification of the user.

2. The system of claim 1, wherein the plurality of UWB communicating devices include at least six UWB communicating devices to provide the gesture classification for whole-body and activity classification.

3. The system of claim 1, wherein at least one of the plurality of UWB communicating devices includes an inertial measurement unit (IMU) sensor.

4. The system of claim 1, further comprising at least one IMU sensor configured to be communicatively coupled to at least one of the plurality of UWB communicating devices, wherein the communicatively coupled UWB communicating device is configured to transmit IMU data of the IMU sensor in the localization packet.

5. The system of claim 1, wherein at least one of the plurality of UWB communicating devices includes one or more finger sensors for determining a conformational state for a finger of the user.

6. The system of claim 1, further comprising one or more finger sensors configured to be communicatively coupled to at least one of the plurality of UWB communicating devices for determining a conformational state for a finger of the user, wherein the communicatively coupled UWB communicating device is configured to transmit measurements from the one or more finger sensors in the localization packets.

7. The system of claim 1, wherein the trained machine learning classifier model includes a recurrent neural network (RNN).

8. The system of claim 1, wherein the local controller is configured to execute the trained machine learning classifier model using the collected localization packets and output the gesture classification of the user.

9. The system of claim 1, wherein the local controller is configured to transmit the collected localization packets including the pair-wise distances to an external device, wherein the external device is configured to execute the trained machine learning classifier model to determine the gesture classification.

10. The system of claim 2, wherein the at least six UWB communicating devices are adapted in a sensing configuration to be placed at six spaced-apart body locations on the user, including at a first wrist or hand, a second wrist or hand, a first ankle or foot, a second ankle or foot, a head or neck, and a torso of the user, and wherein the sensing configuration provides for whole body gesture evaluation.

11. A computer readable medium having instructions stored thereon for the classification of body gestures of a user, wherein the instructions, when executed by a processor, cause the processor to:

receive, on a local controller placed in proximity to a plurality of ultrawide-band (UWB) communicating devices, packets of data from each of the plurality of UWB communication devices arranged as a plurality of nodes in a mesh configuration, wherein the plurality of UWB communicating devices includes a first UWB communicating device configured to sequentially transmit in each of a plurality of messaging cycles, a first localization packet of data to each of the other plurality of UWB communicating devices, including a second UWB communicating device, wherein the first UWB communicating device and the second UWB communicating device are configured to determine time associated values corresponding to receipts of the transmitted localization packets sent from the other UWB communicating devices, wherein the determined time associated value is included in the first localization packet, wherein the first UWB communicating device and second UWB communicating device are configured to be positioned at a plurality of spaced apart locations on a user, including at a first body location and a second body location; and determine pair-wise distances between each respective pairs formed of the plurality of UWB communicating devices using the collected localization packets, wherein the collected localization packets including the pair-wise distances are used in a trained machine learning classifier model to determine a gesture classification of the user.

12. The computer readable medium of claim 11, wherein the plurality of UWB communicating devices further include at least one IMU sensor configured to be communicatively coupled to at least one of the plurality of UWB communicating devices, wherein the instructions executed by the processor further cause the communicatively coupled UWB communicating device to transmit IMU data of the IMU sensor in the localization packet.

13. The computer readable medium of claim 11, wherein the trained machine learning classifier model includes a recurrent neural network (RNN).

14. The computer readable medium of claim 11, wherein the instructions when executed further cause the local controller to execute the trained machine learning classifier model using the collected localization packets and output the gesture classification of the user.

15. The computer readable medium of claim 11, wherein the instructions when executed further cause the local controller to transmit the collected localization packets including the pair-wise distances to an external device, wherein the external device is configured to execute the trained machine learning classifier model to determine the gesture classification.

16. A method for classifying body gestures of a user, the method comprising:

receiving, on a local controller placed in proximity to a plurality of ultrawide-band (UWB) communicating devices, packets of data from each of the plurality of UWB communication devices arranged as a plurality of nodes in a mesh configuration, wherein the plurality of UWB communicating devices includes a first UWB communicating device that sequentially transmits in each of a plurality of messaging cycles, a first localization packet of data to each of the other plurality of UWB communicating devices, including a second UWB communicating device, wherein the first UWB communicating device and the second UWB communicating device determine time associated values corresponding to receipts of the transmitted localization packets sent from the other UWB communicating devices, wherein the determined time associated value is included in the first localization packet, wherein the first UWB communicating device and second UWB communicating device are positioned at a plurality of spaced apart locations on a user, including at a first body location and a second body location; and determining pair-wise distances between each respective pairs formed of the plurality of UWB communicating devices using the passively collected localization packets, wherein the collected localization packets including the pair-wise distances are used in a trained machine learning classifier model to determine a gesture classification of the user.

17. The method of claim 16, wherein the plurality of UWB communicating devices further include at least one IMU sensor communicatively coupled to at least one of the plurality of UWB communicating devices, wherein the communicatively coupled UWB communicating device transmit IMU data of the IMU sensor in the localization packet.

18. The method of claim 16, wherein the trained machine learning classifier model includes a recurrent neural network.

19. The method of claim 16, wherein the body gestures of the user is associated with sport-related gestures, wherein training data set for the trained machine learning classifier model includes sport-associated call signals.

20. The method of claim 16, wherein the body gestures of the user is associated with warehouse or signaling-associated gestures, wherein training data set for the trained machine learning classifier model includes warehouse or signaling-associated body gestures.

* * * * *